(12) United States Patent
Matsuo et al.

(10) Patent No.: US 10,158,397 B2
(45) Date of Patent: Dec. 18, 2018

(54) WIRELESS DEVICE AND WIRELESS COMMUNICATION METHOD

(71) Applicant: Kabushiki Kaisha Toshiba, Minato-ku (JP)

(72) Inventors: Ryoko Matsuo, Shinagawa (JP); Toshihisa Nabetani, Kawasaki (JP); Toshiyuki Nakanishi, Yokohama (JP); Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/029,102

(22) Filed: Jul. 6, 2018

(65) Prior Publication Data

US 2018/0316384 A1 Nov. 1, 2018

Related U.S. Application Data

(63) Continuation of application No. 15/859,148, filed on Dec. 29, 2017, now Pat. No. 10,050,665, which is a (Continued)

(30) Foreign Application Priority Data

Dec. 10, 2013 (JP) .................................. 2013-254858

(51) Int. Cl.
*H04B 1/713* (2011.01)
*H04W 48/16* (2009.01)
(Continued)

(52) U.S. Cl.
CPC .......... *H04B 1/713* (2013.01); *H04W 40/244* (2013.01); *H04W 48/16* (2013.01); *H04W 72/0453* (2013.01); *H04B 13/005* (2013.01)

(58) Field of Classification Search
CPC ... H04B 1/713; H04B 13/005; H04W 40/244; H04W 48/16; H04W 72/0453
See application file for complete search history.

(56) References Cited

U.S. PATENT DOCUMENTS

2002/0060995 A1* 5/2002 Cervello ............... H04W 72/02
370/332
2003/0031146 A1 2/2003 Sugaya
(Continued)

FOREIGN PATENT DOCUMENTS

JP 2006-254398 A 9/2006
JP 2012-004951 A 1/2012
(Continued)

OTHER PUBLICATIONS

International Search Report dated Mar. 17, 2015 in PCT/JP2014/082538.
(Continued)

*Primary Examiner* — Freshteh N Aghdam
(74) *Attorney, Agent, or Firm* — Oblon, McClelland, Maier & Neustadt, L.L.P.

(57) ABSTRACT

According to one embodiment, a wireless device includes a receiver configured to receive a first beacon signal via a first channel; and control circuitry. The control circuitry is configured to: analyze the first beacon signal to obtain channel information for specifying a second channel, change an operation channel of the receiver from the first channel to the second channel, and change, in a case of not receiving a second beacon signal via the second channel during a predetermined period of time, the operation channel of the receiver from the second channel to the first channel. The receiver is further configured to receive a third beacon signal via the first channel after the operation channel is changed from the second channel to the first channel.

28 Claims, 21 Drawing Sheets

Related U.S. Application Data continuation of application No. 15/176,664, filed on Jun. 8, 2016, now Pat. No. 9,887,732, which is a continuation of application No. PCT/JP2014/082538, filed on Dec. 9, 2014.

(51) Int. Cl.
    *H04W 72/04*     (2009.01)
    *H04W 40/24*     (2009.01)
    *H04B 13/00*     (2006.01)

(56) References Cited

U.S. PATENT DOCUMENTS

| | | |
|---|---|---|
| 2008/0100494 A1 | 5/2008 | Yamaura |
| 2008/0175197 A1* | 7/2008 | Shao ............... H04W 72/02 370/329 |
| 2009/0088605 A1 | 4/2009 | Ross et al. |
| 2009/0257380 A1* | 10/2009 | Meier ............. H04W 72/082 370/329 |
| 2010/0290421 A1 | 11/2010 | Morioka |
| 2010/0296434 A1 | 11/2010 | Amagai et al. |
| 2011/0152970 A1 | 6/2011 | Jollota et al. |
| 2011/0261764 A1* | 10/2011 | Shirakata ........ H04W 72/082 370/329 |
| 2013/0077554 A1* | 3/2013 | Gauvreau .......... H04L 5/001 370/312 |
| 2013/0188622 A1* | 7/2013 | Kim ................. H04W 76/36 370/336 |
| 2013/0295861 A1* | 11/2013 | Singh ............... H04W 52/287 455/73 |
| 2014/0023023 A1* | 1/2014 | Jeon .............. H04W 72/0406 370/329 |
| 2014/0237132 A1 | 8/2014 | Yamaguchi |
| 2015/0163828 A1 | 6/2015 | Vandwalle et al. |
| 2016/0100352 A1* | 4/2016 | Yunoki ............. H04W 48/16 370/254 |
| 2016/0183258 A1 | 6/2016 | Matsuo et al. |
| 2016/0198345 A1 | 7/2016 | Fan et al. |
| 2016/0205639 A1* | 7/2016 | Song ................ H04W 16/14 455/522 |

FOREIGN PATENT DOCUMENTS

| | | |
|---|---|---|
| JP | 2015-050386 A | 3/2015 |
| WO | 2010/007743 A1 | 1/2010 |

OTHER PUBLICATIONS

International Preliminary Report on Patentability and Written Opinion dated Jun. 23, 2016 in PCT/JP2014/082538 filed Dec. 9, 2014 (English translation only).

"IEEE Standard for Local and metropolitan area networks—Part 15.4: Low-Rate Wireless Personal Area Networks (LR-WPANs): Amendment 1: MAC sublayer" LAN/MAN Standards Committee of the IEEE Computer Society, IEEE Std 802.15.4e™-2012, Apr. 2012, 224 Pages.

"IEEE Standard for Local and metropolitan area networks—Part 15.6: Wireless Body Area Networks" LAN/MAN Standards Committee of the IEEE Computer Society, IEEE Std 802.15.6™-2012, Feb. 2012, 270 Pages.

* cited by examiner

WIRELESS DEVICE AND WIRELESS COMMUNICATION METHOD

CROSS REFERENCE TO RELATED APPLICATIONS

This application is a continuation of U.S. application Ser. No. 15/859,148, filed Dec. 29, 2017, which is a continuation of U.S. application Ser. No. 15/176,664, filed Jun. 8, 2016 (now U.S. Pat. No. 9,887,732, issued Feb. 6, 2018), which in turn is a Continuation of International Application No. PCT/JP2014/082538, filed on Dec. 9, 2014, and claims priority to Japanese Patent Application 2013-254858, filed in the Japanese Patent Office on Dec. 10, 2013, the entire contents of each of which are hereby incorporated by reference.

FIELD

Embodiments described herein relate to a wireless device and a wireless communication method.

BACKGROUND

In a wireless communication, there is a problem that interference occurs with other systems or other appliances. Especially, in 2.4 GHz band, which is used in a wireless LAN or Bluetooth (trademark) etc., a problem is easily possible to occur that the band is simultaneously employed among a plurality of systems or among a plurality of access points in the same system. Accordingly, measure to avoid interference among the systems or the access points is required.

Generally, as a method to avoid the interference, a channel hopping scheme is employed which changes a channel according to a hopping pattern of predetermined channels to perform communication. In the IEEE802. 15. 4, a method is standardized in which a node searches a new channel by iteratively the following processes: specifying a candidate channel from channels included in a hopping pattern, and performing channel change to the candidate channel and channel scan. In the method, however, it is required to scan some channels even if a number of candidate channels to be scanned is restricted. Therefore, it takes time to perform the channel change and the channel scan while power consumption increases.

On the other hand, in a communication system in which a child appliance functions as a relay node, the following method is proposed. Specifically, a parent appliance which uses a channel #f1 notifies channel numbers (i.e., channel Nos.) of the previous channel #f0 and a change candidate channel #f2 to the child appliance. The child appliance which is notified of the channel numbers uses the previous channel #f0 to notify the channel numbers of the current communication channel #f1 and the change candidate channel #f2 to other child appliance(s) which directly does not communicate with the parent appliance. In the method, the time taken for the channel change is shortened although the other child appliance only follows up one channel before the channel change. Therefore, in a case where there is a child appliance which is sleeping for a long time, the child appliance is likely to not be able to follow up a latest channel.

DETAILED DESCRIPTION

According to one embodiment, a wireless device includes a receiver configured to receive a first beacon signal via a first channel; and control circuitry. The control circuitry is configured to: analyze the first beacon signal to obtain channel information for specifying a second channel, change an operation channel of the receiver from the first channel to the second channel, and change, in a case of not receiving a second beacon signal via the second channel during a predetermined period of time, the operation channel of the receiver from the second channel to the first channel. The receiver is further configured to receive a third beacon signal via the first channel after the operation channel is changed from the second channel to the first channel.

Hereinafter, embodiments of the present invention will be described with reference to the drawings.

First Embodiment

Figure 1:
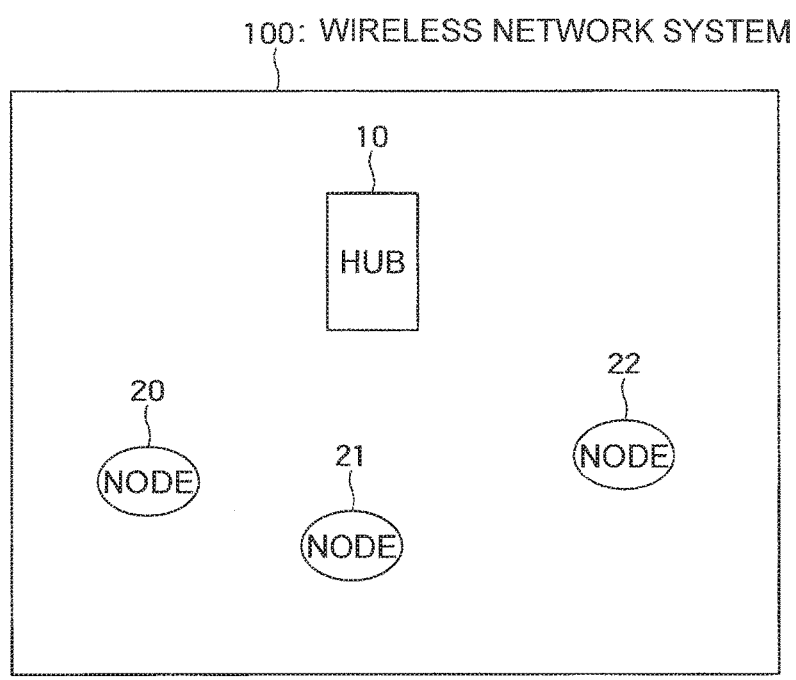
FIG. 1 is a view showing one example of a wireless network system according to a first embodiment.

FIG. 1 illustrates one example of a wireless network system relating to a first embodiment. A wireless network system 100 illustrated in FIG. 1 includes a hub 10 and a plurality of nodes 20, 21 and 22. The hub 10 includes a wireless communication device (or wireless device) that is operated as a center device. Each node includes a wireless communication device that is operated as a terminal of the center device. The hub 10 is a communication target device for the nodes 20, 21 and 22, and the nodes 20, 21 and 22 are communication targets devices for the hub 10.

Each node incorporates one or more sensors for example, and wirelessly transmits sensing information acquired by the sensor to the hub 10. Also, each node wirelessly receives control information or the like needed for communication from the hub.

The system may be a network called a body area network which is a wireless network formed on a human body. In the body area network, the hub as a center device and the nodes as terminal devices are mounted on a human body, and communication between the hub and the nodes is performed. As the sensors on mounted on the nodes, a biosensor such as a sleep sensor, an acceleration sensor, an electrocardiogram sensor, a body temperature sensor and a pulse sensor is assumed. The present embodiment is not limited to the body area network. The communication network system according to the present embodiment may be an arbitrary network as long as a hub and nodes can be arranged and the hub operates as the center device.

In the system, two types of channels are employed to communicate between the hub and the nodes: a control channel and a data channel. For the control channel, at least one channel is provided. In a case where a plurality of hubs are present, a plurality of control channels may be provided. In the case, adjacent hubs may be allowed to employ the same control channel. For the data channel, a plurality of channels are provided. The hub can change the data channel to be used.

The hub periodically transmits a beacon signal which is an announcement signal via the control channel (control channel beacon signal). The hub periodically transmits a beacon signal which is an announcement signal via the data channel (data channel beacon signal).

The period of the beacon signal transmitted via the control channel may be the same as or different from the period of the beacon signal transmitted via the data channel. An interval between successive two beacon signals is called a beacon interval. Especially, an interval between successive data channel beacon signals is called a data channel beacon interval. In the data channel beacon interval, one or a plurality of access periods are included. For example, one specific access period may be arranged or a plurality of access periods having respective different types may be arranged in a certain sequence. For example, as the one specific access period, only an allocation-based access period may be arranged. Alternatively, as the plurality of access periods having respective different types, the allocation-based access period and a contention-based access period may be arranged. Or, the allocation-based access period, the contention-based access period and an inactive period in which no communication are carried out may be arranged. In the case where the plurality of access periods having respective different types are arranged, a sequence of the periods to be arranged may not be limited to a specific sequence.

The allocation-based access period includes a plurality of slots. Each node can be allocated one or plural slots. Each node is not necessarily allocated the slot in every beacon interval and may be allocated the slot every a given number of beacon intervals. In a case that the node has a frame for transmitting to the hub (a data frame, a control frame, a management frame, etc.), the node can transmit the frame in a slot allocated to node-self (node-self allocated slot).

The contention-based access period is a period in which communication is carried out according to any contention-based access scheme. As the contention-based access scheme, a slot Aloha-based scheme (slotted aloha scheme) or the CSMA-based scheme can be employed. For example, in the slot Aloha-based scheme, a plurality of slots are arranged in the contention-based access period, and in a case where the node has the frame for transmission, the node determines whether or not to transmit the frame at a predetermined probability by generating a random number. When transmitting of the frame is determined, the node transmits the frame at a start timing of the slot. When no transmitting of the frame is determined, the transmission of the frame is skipped. A value of the predetermined probability can be changed as a parameter. In a case that a plurality of nodes simultaneously transmits the frames at the start timing of the slot, the signals of the frames collides with each other and the transmission by the nodes may fail at a high probability. In order to use the slot in the contention-based access period, unlike the allocation-based access period, each node is not required to be previously allocated the slot by the hub.

In the control channel, a communication scheme employing carrier-sensing, specifically, a CSMA (Carrier Sense Multiple Access)-based communication scheme is assumed. In the CSMA scheme, the carrier-sensing is carried out, and if a result of the carrier-sensing indicates an idle state, a transmission right can be acquired. During a time for which the hub transmits the beacon signal via the control channel, only the hub can occupy the time and the nodes cannot communicate during the time. The communication scheme used in the control channel is not restricted to the CSMA-based communication scheme. In the control channel, communication may be carried out in a slot unit or carried out at any timing but not in the slot-base.

Before the node connects to the hub, it awaits to receive the control channel beacon signal at the control channel. When the node receives the control channel beacon signal, it performs channel change to the data channel according to a data channel number (data channel No.) included in the beacon signal. The node receives the data channel beacon signal at the data channel. The node performs, for example, connection process with the hub and data transmission/reception with the hub by using the data channel in the contention-based access period.

Figure 2:
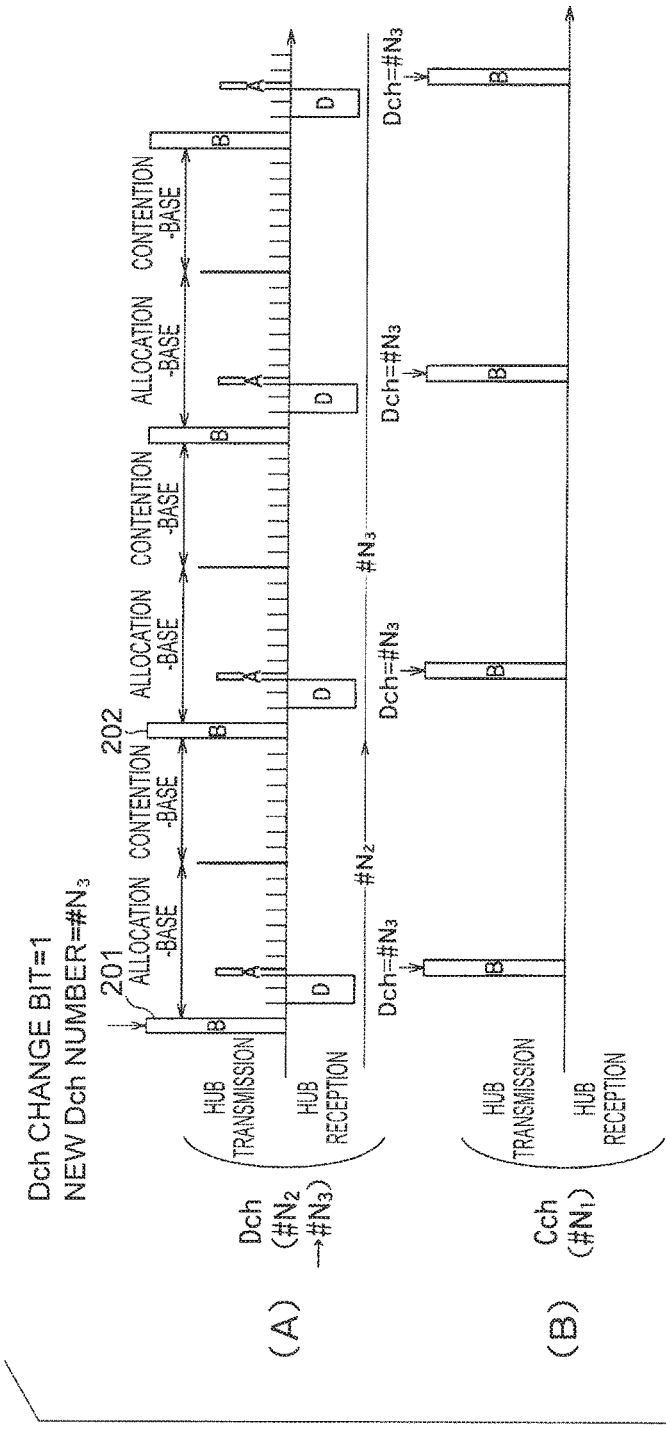
FIG. 2 is a drawing for explaining an access scheme used at a time of a channel change in a system according to the first embodiment.

With reference to FIG. 2, the access scheme used at the time of channel change in the system according to the first embodiment is explained. In FIG. 2(A), signals which the hub transmits/receives to/from the node in the data channel are shown and in FIG. 2(B), signals which the hub transmits/receives (here only transmission) to to/from the node in the control channel are shown. A horizontal axis indicates a time axis and a right direction thereof along the drawing is a direction of time passage. In the drawing, vertically long rectangles with character "B" indicate the beacon signals which the hub transmits. The vertically long rectangle with character "D" indicates a data frame which the hub receives from the node, and the vertically long rectangle with character "A" indicates a response frame (Ack frame) which the hub transmits to the node. In the present example, the case is shown that the allocation-based access period and the contention-based access period are arranged in the data channel beacon interval although the present embodiment does not be limited to the arrangement as stated above.

The hub first uses the data channel (Dch) of the channel #$N_2$ and the control channel (Cch) of the channel #$N_1$. The hub determines to change the data channel under any judgment. In this example, the hub determines to change the data channel from the channel #$N_2$ to the channel #$N_3$. The hub transmits the beacon signal 201 via the data channel of the current used channel #$N_2$, the beacon signal including information showing that the data channel is to be changed and information on the data channel No. after the change (new data channel No.). For example, a "data channel change bit" is set to "1" (which means data channel change existence) and "data channel No." field is set to the new data channel No. "#$N_3$". The hub employs the channel of the channel #$N_3$ on or after transmission of a next beacon signal 202. In the beacon signal 202, "data channel change bit" is set to "0".

In the control channel beacon signal which the hub transmits, a "data channel No." field is included. The hub updates the "data channel No." field to the channel #$N_3$. For example, the hub updates the data channel No. in the beacon signal transmitted via the control channel to the "#$N_3$" on a trigger that data update (the channel change bit and the new channel No. are set) is carried out in the data channel beacon signal in order to change the data channel.

After the node connects to the hub, it performs control by using substantially only the data channel. The node receives the beacon signal 201 of the data channel and confirms the information of the data channel change existence to recognize that the data channel is to be changed. The node changes the data channel to the channel of the new data channel No. included in the beacon signal 201. In this example, the node changes the data channel from the channel #$N_2$ to #$N_3$. The timing of changing the data channel may be any timing. In the present embodiment, the timing of changing the data channel may be a timing at which the data channel beacon signal 202 is transmitted from the hub subsequent to the data channel beacon signal 201 which notifies the data channel change.

In this example, the "data channel change bit" field is provided in the data channel beacon signal transmitted by the hub and existence or non-existence of change of the data channel No. can be determined by a value of one bit in the field. Therefore, processing load on the node born when judging the existence or non-existence of change of the data channel can be reduced. The field is not indispensable and the configuration not including the "data channel change bit" field can be adopted. In this case, the node always checks the "data channel No." field and if the value of the field changes, it can determine for the data channel to be required to be changed.

Figure 3:
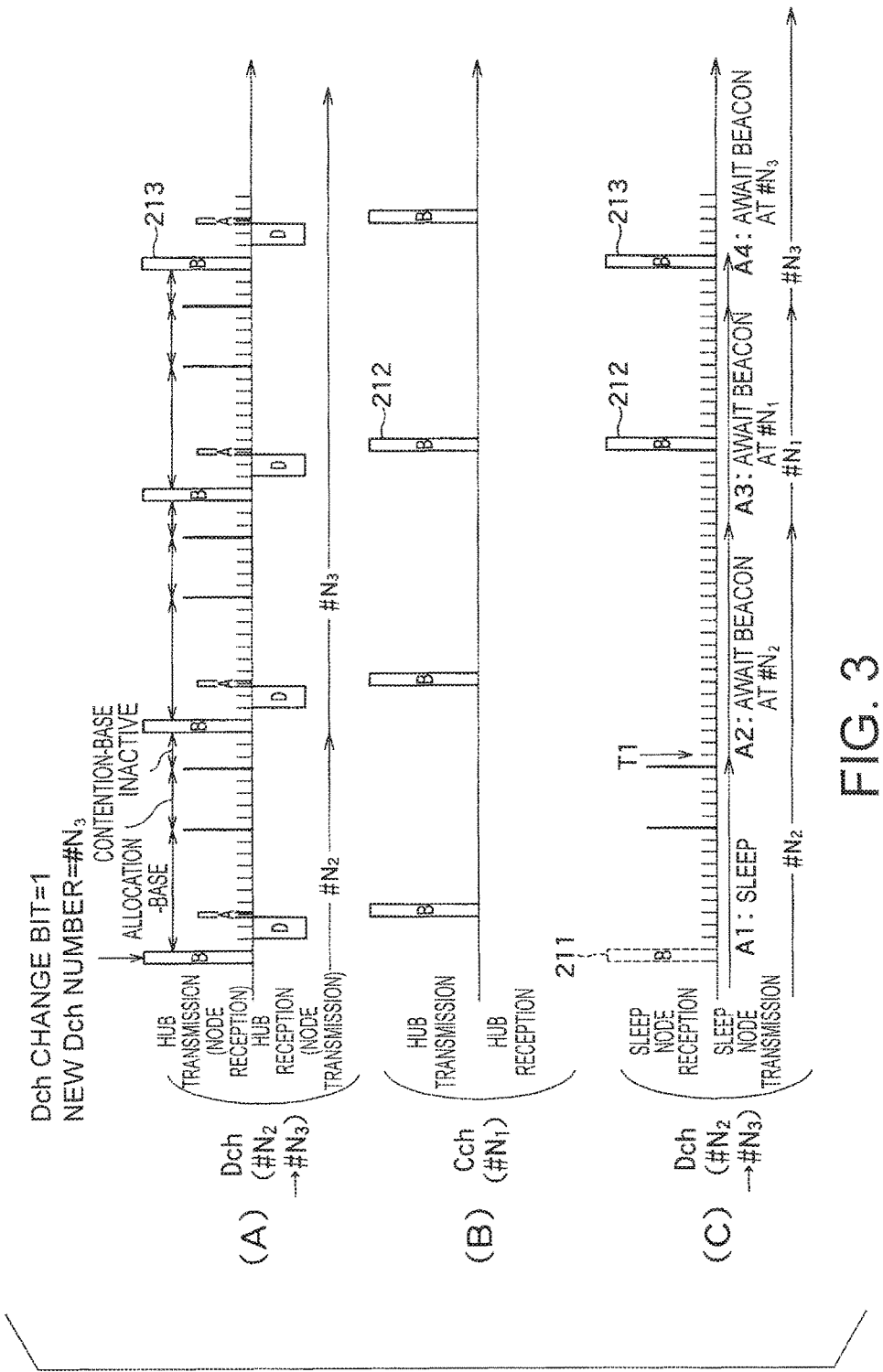
FIG. 3 is a drawing for explaining an access scheme used at a time of a channel change in a sleep node.

With reference to FIG. 3, the access scheme used at the time of the channel change in the sleep node is explained.

FIG. 3(A) and FIG. 3(B) are substantially the same as the FIG. 2(A) and FIG. 2(B). However, in the data channel beacon interval, the inactive period is arranged in addition to the allocation-based access period and the contention-based access period. The additional arrangement of the inactive period does not influence the operation of the hub and therefore more explanation is omitted. The arrangement is merely one example, and the present embodiment is not limited to the arrangement as stated above.

FIG. 3(C) illustrates an operation example of the data channel change in the sleep node. The sleep node is a node which in order to reduce power consumption, periodically starts up (or is activated) and a constant time after the starting up, again sleeps for a certain period of time. The sleep means a state in which the power consumption is lower than power consumption at a normal operation. As one example of the sleep, it may be realized by stopping electric power supply to a part of constitution elements in the communication device or a part circuit in the part. Alternatively, it may be realized by lowering an operating frequency or setting it to a state in which information cannot be received from a network. The sleep node having a long time of sleeping may be called a long sleep node. The sleep node does not receive the data channel beacon signal during the sleep period. The dashed rectangle 211 with character "B" indicates to not receive the data channel beacon signal. The sleep node enters into the sleep operation when it uses the data channel of channel #$N_2$.

The node starts up at the time T1 during the sleep operation (A1). After the sleep node starts up, it awaits reception of the beacon signal from the hub at the data channel during at least one data channel beacon interval (A2). The node awaits the reception of the beacon signal at the data channel of the No. (i.e., #$N_2$) used immediately before it enters into the sleep operation. When the node receives the data channel beacon signal which notifies the data channel change during that time, the node changes the data channel to the channel of the number included in the beacon signal as be the case in FIG. 2.

When the sleep node does not receive data channel beacon signal from its connected hub during the at least one data channel beacon interval, the node changes the operation channel to the control channel (#$N_1$) once. The sleep node then awaits reception of the control channel beacon signal 212 transmitted from the connected hub at the control channel (A3). When the sleep node receives the control channel beacon signal 212, it recognizes data channel No. currently used by the hub based on the beacon signal. In this example, the node recognizes that the data channel No. is #$N_3$. Accordingly, the node again changes the operation channel from the control channel (#$N_1$) to the new data channel (#$N_3$). The node awaits the beacon signal 213 at the data channel (#$N_3$) after the change (A4).

Figure 4:
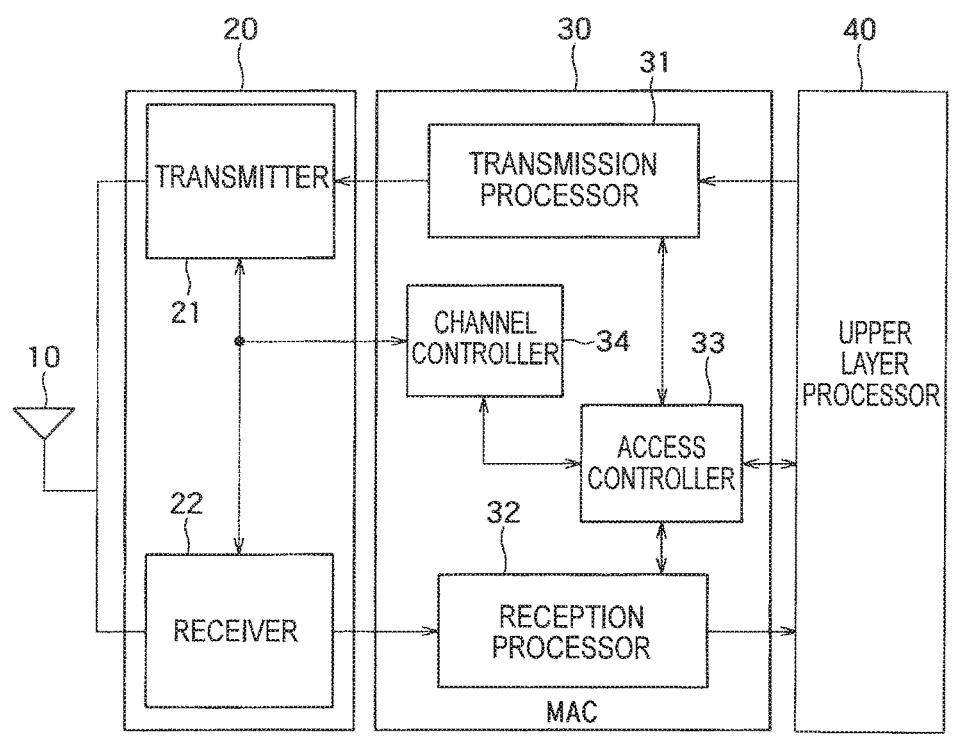
FIG. 4 is a block diagram of a wireless communication device which is a hub according to the first embodiment.

FIG. 4 shows a configuration example of the hub including the wireless communication device (or wireless device) according to the present embodiment. The wireless communication device includes an antenna 10, a PHY&RF unit 20, a MAC unit 30 that is a communication processing device or control circuitry according to the present embodiment, and an upper layer processor 40. The PHY&RF unit 20 includes a transmitter 21 and a receiver 22. The MAC unit 30 includes a transmission processor 31, a reception processor 32, an access controller 33, and a channel controller 34.

The access controller 33 manages accesses by the control channel and the data channel. The access controller 33 controls to transmit the beacon signal at each channel at a desired timing. The access controller 33 instructs to transmit the beacon signal of the control channel or the data channel to the transmission processor 31. Upon receiving the instruction, the transmission processor 31 generates a frame of the beacon signal of the control channel or the data channel. The transmission processor 31 outputs the generated frame to the transmitter 21. The beacon signal of the control channel includes channel information of the data channel (e.g., channel No.).

The transmitter 21 performs transmission by the control channel and transmission by the data channel. The receiver 22 performs reception by the control channel and reception by the data channel. The transmitter 21 performs each transmission via each channel of No. instructed from the channel controller 34 which is described later. The receiver 22 performs each reception via each channel of No.

instructed from the channel controller 34. The transmitter 20 may simultaneously or independently perform the transmission by the data channel and the transmission by the control channel, and the receiver 22 may simultaneously or independently perform the reception by the data channel and the reception by the control channel. The beacon signal frame of the control channel is transmitted via the control channel and the beacon signal frame of the data channel is transmitted via the data channel. A data frame is transmitted via the data channel.

The transmitter 21 performs processing of a physical layer on the frame input from the transmission processor 31, according to a communication scheme applied for the control channel or the data channel. The transmitter 21 performs D/A conversion and frequency conversion, etc. on the frame subjected to the processing of the physical layer to generate a transmission signal. The transmitter 21 radiates the transmission signal as a radio wave into a space through the antenna 10. The number of antenna(s) is one or plural number.

The receiver 22 receives a signal through the antenna 10. The receiver 22 performs reception processing on the received signal, and output the frame obtained by the reception processing to the reception processor 32. The reception processing may include processing of the physical layer such as a frequency conversion to a baseband, and A/D conversion, analysis of a physical header of the frame subjected to the A/D conversion and demodulation processing.

The channel controller 34 controls the setting of the PHY&RF unit 20, i.e., the setting of the transmitter 21 and the receiver 22. For example, the channel controller 34 sends, according to the instruction from the access controller 33, the number (i.e., channel No.) of the channel to be used to the PHY&RF unit 20. The PHY&RF unit 20 sets, according to the channel No. notified from the channel controller 34, the operation channel of the transmitter 21 and the receiver 22. Two sets of the transmitter and the receiver may be provided for the data channel and the control channel, respectively. In this example, the channel controller 34 is provided independently from the access controller 33 although the function of the channel controller 34 may be incorporated into the access controller 33 resulting in a processing unit of one block.

The reception processor 32 performs analysis or the like of a MAC header of the frame input from the receiver 22. When the reception processor 32 receives the connection request frame from the node, the reception processor 32 notifies the connection request received from the node to the access controller 33. The access controller 33 determines allocation of the slot(s) based on the connection request and notifies a result of the determination to the transmission processor 31. The access controller 33 determines, for example, a number of slots to be allocated within the data channel beacon interval, positions of the slots allocated, a period of a beacon interval at which the slot(s) are allocated. The node transmits the connection request frame, for example, in the contention-based access period of the data channel.

The transmission processor 31 generates the connection response frame according to the result of the determination notified from the access controller 33. In the case that the connection request frame notified from the node includes information on a sensor type of a sensor mounted in the node or information similar to the sensor type, the access controller 33 may extract the information and notify the information to the upper layer processor 40. The upper layer processor 40 may determine the number of slots to be allocated within the beacon interval and the period of the beacon interval at which the slot(s) are allocated, etc. based on the notified information. In this case, the upper layer processor 40 notifies the information such as the number of slots to be allocated as determined to the access controller 33. The access controller 33 performs slot allocation based on the notified information. Alternatively, if, in the side of the node which is the transmission side of the connection request frame, information such as the number of slots to be allocated and a period of a beacon interval at which the slots are allocated may be determined according to the processing as stated above and the determined value may be included in the connection request frame. In this case, the upper layer processor 40 may determine the number of slots to be allocated etc. based on the value included in the connection request frame. The access controller 33 instructs the transmission processor 31 to generate the connection response frame including allocation information of slots. The transmission processor 31 generates the connection response frame and transmits it via the transmitter 21 through the data channel.

When the reception processor 32 determines that the frame input from the receiver 22 is a data frame according to the analysis of the MAC header of the frame, the recession processor 32 outputs the frame to the upper layer processor 40 as necessary.

The access controller 33 receives notification such as a channel state (S/N ratio etc.) or an error state of frames transmitted/received for the node, from the reception processor 32, and determined whether to perform the channel change.

When there is downlink data to be transmitted to the node, the upper layer processor 40 passes a data frame including the data to the transmission processor 31. The access controller 33 instructs the transmission processor 31 to transmit the data frame to the node in a downlink slot acquired by any method (for example, method using a beacon signal of the data channel or the control channel). The transmission processor 31 performs a MAC header addition process or the like on the frame and outputs the processed frame to the transmitter 21. The transmitter 21 transmits the frame input from the transmission processor 31 through the data channel. Specifically, the transmission processor 31 performs the physical layer processing, such as modulation processing and physical header addition, to the frame. The transmission processor 31 performs D/A conversion or frequency conversion to the processed frame and radiates the signal as a radio wave to the space through the antenna 10.

Figure 6:
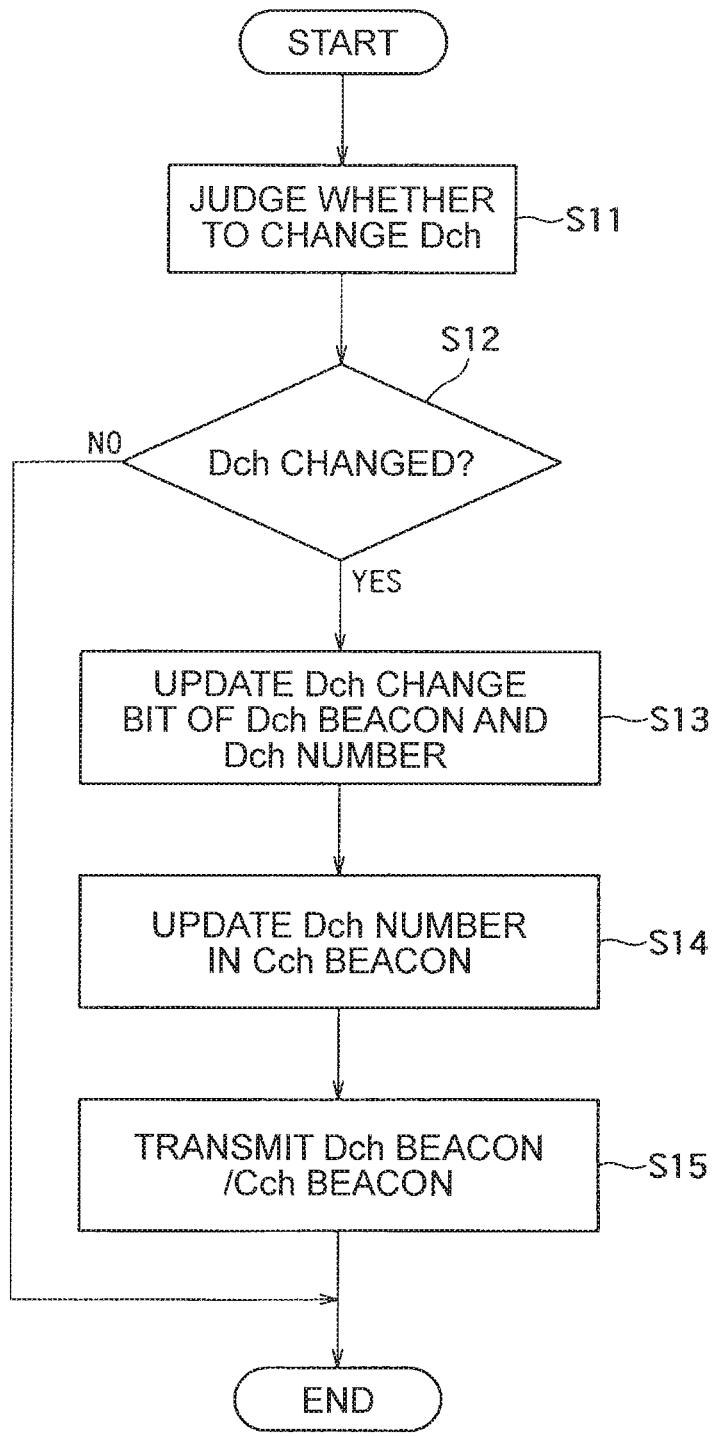
FIG. 6 is a flow chart of channel management processing in a hub.

FIG. 6 is a flow chart of channel management processing performed by the hub.

The access controller 33 of the hub starts the processing at any trigger such as periodically or when any condition is satisfied. The access controller 33 first determines whether to perform the channel change of the data channel (S11). For example, it determines whether to perform the channel change based on information such as the channel state or the error state of the frames transmitted/received for the node, notified from the reception processor 32. When the access controller 33 determines not to change the data channel (NO in S12), it ends the processing.

When the access controller 33 determines to change the data channel (YES in S12), it instructs the transmission processor 31 to generate a beacon signal frame in which the channel change existence information being the bit set in the data channel change field and the new data channel No. are inserted (S13). The transmission processor 31 generates the beacon signal frame of the data channel according to the instruction from the access controller 33.

The access controller 33 instructs the transmission processor 31 to change the data channel No. included in the control channel beacon signal to the new data channel No. (S14). The transmission processor 31 generates the beacon signal frame, of the control channel, including the new data channel No. according to the instruction from the access controller 33.

The access controller 33 instructs the transmission processor 31 to transmit the beacon signal frame at a beacon transmission timing of the data channel, the beacon signal frame including the channel change existence information and the new data channel No. The transmission processor 31 transmits the beacon signal frame at a beacon transmission timing of the data channel via the transmitter 20 by the data channel, the beacon signal frame including the channel change existence information and the new data channel No. (S15).

The access controller 33 instructs the transmission processor 31 to transmit the beacon signal frame including the new data channel No. at a beacon transmission timing of the control channel. The transmission processor 31 transmits the beacon signal frame including the new data channel No. at a beacon transmission timing of the control channel via the transmitter 20 by the control channel (S15).

The access controller 33 then changes the setting of the transmitter 20 and the receiver 22 via the channel controller 34 so that the channel of the new data channel No. is used on or subsequent to transmission of the next data channel beacon signal.

Figure 5:
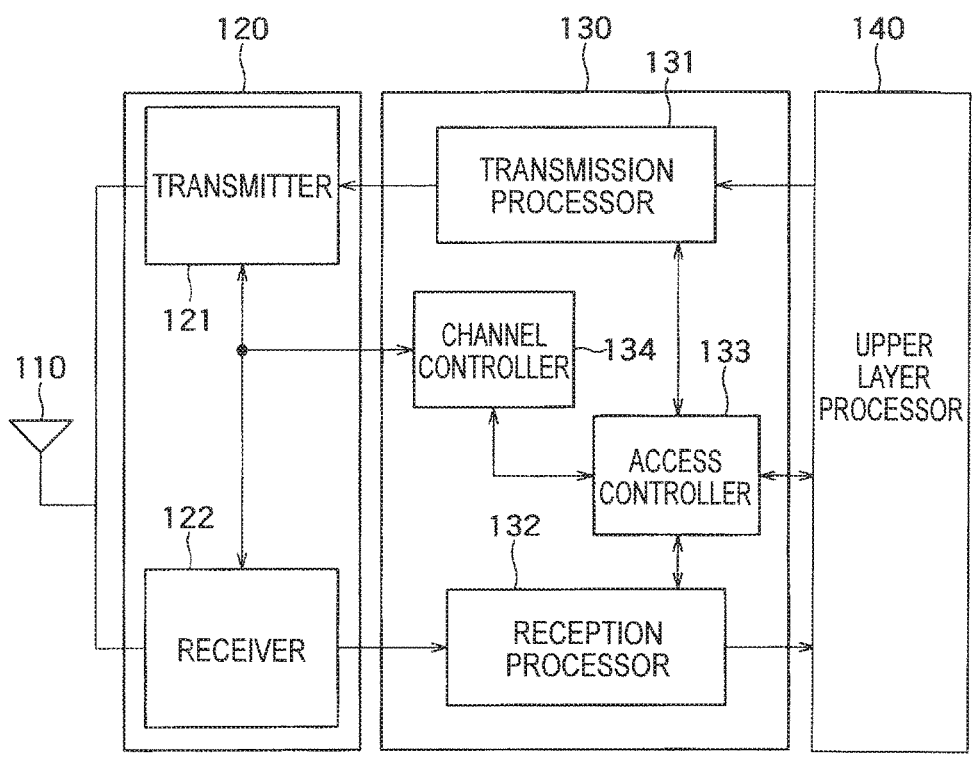
FIG. 5 is a block diagram of a wireless communication device which is a node according to the first embodiment.

FIG. 5 illustrates a block diagram of an example of configuration of the node including the wireless communication device (or wireless device) according to the present embodiment. The node includes an antenna 110, a PHY&RF unit 120, a MAC unit 130 that is a communication processing device or control circuitry according to the present embodiment, and an upper layer processor 140. The PHY&RF unit 120 includes a transmitter 121 and a receiver 122. The MAC unit 130 includes a transmission processor 131, a reception processor 132, an access controller 133 and a channel controller 134. The transmission processor 131 and reception processor 132 may include a transmission buffer and a reception buffer, respectively. The upper layer processor 140 includes a sensor information acquirer which acquires the information of the sensor. The information of the sensor includes not only sensing information of the sensor but also information for specifying a state of the sensor and information on a sensing time etc.

The upper layer processor 140 outputs a transmission request for connection with the hub to the access controller 133 at predetermined timing, such as at the start or at the generation of transmission data. The upper layer processor 140 generates a frame including transmission data, such as sensing information, and outputs the frame to the transmission processor 131. Examples of the transmission data include sensing information acquired by a sensor such as a biological sensor, data indicating a result of processing of the sensing information by an application or the like, and data including a current state of the node. However, the transmission data is not limited to specific data.

The upper layer processor 140 may be configured by a program executed by a processor such as CPU, may be configured by hardware, or may be configured both of software and hardware. The upper layer processor 140 may perform processing of communication protocol of an upper layer higher than MAC layer, such as TCP/IP or UDP/IP.

When the access controller 133 receives the transmission request from the upper layer processor 140, the access controller 133 outputs a transmission instruction of the connection request frame to the transmission processor 131. The transmission processor 131 outputs the connection request frame to the transmitter 121 upon receiving a transmission instruction from the access controller 133.

The transmitter 121 performs transmission by the control channel and transmission by the data channel. The receiver 122 performs reception by the control channel and reception by the data channel. The transmitter 121 transmits the frame via the channel of No. instructed from the channel controller 134 which is described later. Specifically, the transmitter 121 performs processing of a physical layer on the frame input from the transmission processor 131. The transmitter 121 performs D/A conversion and frequency conversion, etc. on the frame subjected to the processing of the physical layer to generate a transmission signal. The transmitter 121 radiates the transmission signal as a radio wave into a space through the antenna 110.

The receiver 122 receives the frame via the channel of No. instructed from the channel controller 134. For example, the receiver 122 receives the beacon signal frame transmitted via the control channel by the hub. The receiver 122 receives the beacon signal frame transmitted via the data channel by the hub. Specifically, the receiver 122 receives a signal through the antenna 110 and performs reception processing on the received signal to obtain a reception frame. The receiver 122 outputs the reception frame to the reception processor 132. The reception processing may include processing of the physical layer such as a frequency conversion to a baseband, and A/D conversion, analysis of a physical header of the frame subjected to the A/D conversion and demodulation processing.

The channel controller 134 controls the setting of the PHY&RF unit 120, i.e., the setting of the transmitter 121 and the receiver 122. For example, the channel controller 134 sends the number (i.e., channel No.) of the channel to be used to the PHY&RF unit 120. The PHY&RF unit 20 sets the transmitter 21 and the receiver 22 so that the transmitter 21 and the receiver 22 perform transmission/reception at the channel of No. notified from the channel controller 134. In this example, the channel controller 134 is provided independently from the access controller 133 although the function of the channel controller 134 may be incorporated into the access controller 133 resulting in a processing unit of one block.

Two antennas may be arranged in the node and two sets of the transmitter and the receiver may be provided for the data channel and the control channel, respectively. In this configuration, the control channel and the data channel may be simultaneously employed.

The reception processor 132 performs analysis or the like of a MAC header of the frame input from the receiver 122. When the received frame is a connection response frame, the reception processor 132 notifies the connection response to the access controller 133. When the access controller 133 receives the connection response frame, it determines to change the operation channel of the transmitter 121 and the receiver 122 from the control channel to the data channel. The access controller 133 instructs the channel controller 134 to perform the channel change from the control channel to the data channel. Upon receiving the instruction, the channel controller 134 instructs the PHY&RF unit 120 to change the operation channel to the data channel.

The access controller 133 controls access of the data channel based on information such as allocation slot information of the data channel included in the connection response frame. The access controller 133 knows a buffering state of frames in the transmission processor 131. The access controller 133 instructs the transmission processor 131 to transmit the data frame at the timing of the slot allocated to the node-self in the allocation-based access period. The transmission processor 131 performs a MAC header addition process or the like on the data frame and outputs the processed frame to the transmitter 121.

When the access controller 133 transmits the frame such as the data frame in the contention-based access period, it determines, in the case of slotted-aloha scheme, transmission or non-transmission at a predetermined transmission probability at a start timing of any slot. When the transmission is determined, the access controller 133 instructs the transmission processor 31 to transmit the frame at the start timing of the slot. When the non-transmission is determined, the access controller 133 skips the transmission and performs similar processing at a subsequent slot(s) in the contention-based access period.

In the CSMA-based scheme, the access controller 133 performs carrier-sensing via the reception processor 132 by using the receiver 122. If the carrier is not detected, i.e., a signal having a higher level than a predetermined level is not received, the access controller 133 determines that the result of the carrier-sensing indicates an idle state. In this case, the node acquires a transmission right and controls the transmission processor 31 to transmit the frame. Even in the CSMA-based scheme, access may be carried out in a slot unit as the case of the slotted aloha access. In this case, for example, the carrier-sensing is carried out at a start timing of the slot, and if the result of the carrier-sensing indicates the idle state, the transmission right is acquired to transmit the frame at the slot.

In FIG. 5, signals are sent/received among the carrier-sensing related blocks via the reception processor 132 although the receiver 122 and access controller 133 directly send/receives the signals to/from each other.

When the reception processor 132 determines, as a result of analysis on the MAC header of the frame input from the receiver 122 or the like, that the received frame is a data frame, the reception processor 132 outputs the frame after the processing to the upper layer processor 140 as necessary.

The channel controller 134 and the access controller 133 may internally hold information necessary for various controls or may hold the information in an accessible storage not shown. For example, the status of the node, and the status of the hub, channel No. of the data channel, channel No. of the control channel or the like may be held. Examples of the status of the node include information indicating whether the connection processing is already executed and information of the remaining amount of battery. The status of the hub may include the information of the transmission timing of the beacon signal of the control channel or the transmission timing of the beacon signal of the data channel. Further, the status of the hub may include ON/OFF state (i.e., Enable/Disable state) of the power of the hub or other information.

Below, the operation example in the node is described. The access controller 133 manages an access by the control channel based on a transmission request from the upper layer processor 140. The node may previously store therein information for identifying the control channel or perform channel search to specify the control channel.

The access controller 133 receives the beacon signal transmitted from the hub by the control channel and acquires information required to generate the connection request and information of the data channel. The access controller 133 instructs the transmission processor 131 to transmit the connection request frame based on the acquired information. The transmission processor 131 generates the connection request frame and transmits it via the transmitter 121 thought the control channel. The access controller 133 awaits the connection response frame from the hub.

The access controller 133, upon receiving the connection response frame, instructs the channel controller 134 to change the operation channel from the control channel to the data channel. The channel controller 134 notifies, according to the instruction, information on the data channel to the PHY&RF unit 120. The PHY&RF unit 120 changes, according to the notification from the channel controller 134, the operation channel to the data channel.

The access controller 133 manages an access of the data channel based on allocation slot information of the data channel included in the connection response frame. The access controller 133 knows a buffering state of frames in the transmission processor 131. The access controller 133 instructs the transmission processor 131 to transmit the data frame at the timing of the slot allocated to the node-self. Alternatively, the access controller 133 acquires the transmission right according to the contention-based access scheme used in the contention-based access period and then instructs the transmission processor 31 to transmit the data frame.

Subsequently, as the operation of the node, the operation at the channel change is described.

Figure 7:
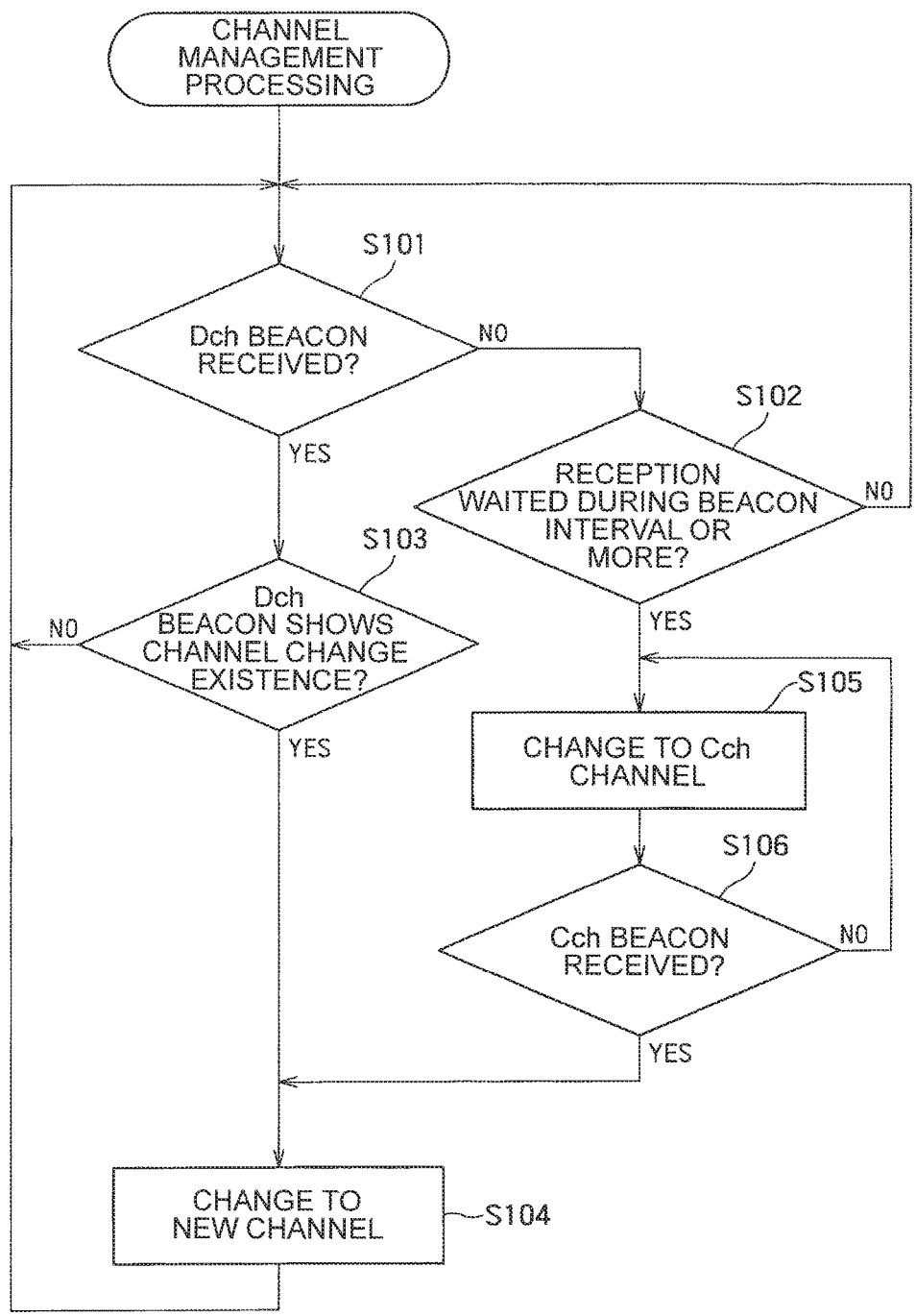
FIG. 7 is a flow chart of channel management processing in a node.

FIG. 7 is a flow chart of the channel management processing in the node. The access controller 133 of the node awaits reception of the beacon signal from the hub at the data channel of the channel No. set to the node-self during the beacon interval of the data channel or more (S101, S102). When the access controller 133 receives the data channel beacon signal from the hub during awaiting the beacon signal (YES in S101), it determines based on the beacon signal whether the data channel is changed (S103). For example, when the beacon signal includes the channel change existence information, the access controller 133 determines that the data channel is changed. When the data channel is not changed, the processing returns to step S101, the access controller 133 awaits the reception of the data channel beacon signal from the hub.

When the access controller 133 determines that the data channel is changed (YES in S103), it controls the channel controller 134 to change the data channel to the channel of the new data channel No. specified in the data channel beacon signal (S104). Specifically, the access controller 133 instructs the transmitter 121 and the receiver 122 to perform channel change to the new data channel No. via the channel controller 134. The timing of the channel change may be a transmission timing of the data channel beacon signal next transmitted or may be on the instant if the node does not perform communication in the current beacon interval.

When the access controller 133 does not receives the data channel beacon signal during the beacon interval of the data channel or more (NO in S101 and YES in S102), it changes the operation channel to the control channel (S105). Specifically, the access controller 133 instructs, via the channel controller 134, the transmitter 121 and the receiver 122 to perform channel change to the control channel No.

The access controller 133 awaits reception of the control channel beacon signal at the control channel (S106). When the access controller 133 receives the control channel beacon signal (YES in S106), it recognizes the new data channel No. based on the beacon signal. The access controller 133 then change the operation channel from the control channel to the new data channel (S104). Specifically, the access controller 133 instructs, via the channel controller 134, the transmitter 121 and the receiver 122 to perform channel change to the new data channel No.

According to the first embodiment, the hub stores at least the new data channel No. among the channel change existence information and the new data channel No. in the data channel beacon signal. The hub stores information on the new data channel No. in the control channel beacon signal. Therefore, the normal node, which is not sleeping, can shift to the new data channel without changing the operation channel to the control channel. On the other hand, the sleep node returns from the sleep and then changes the operation channel to the control channel (i.e., a minimum number of times of channel changes) to know the data channel and thereby can shift to the new data channel.

Second Embodiment

In the first embodiment, the method is proposed in which the channel change and the new data channel No. are notified via the data channel beacon signal. In the second embodiment, in addition to the channel change and the new data channel No., the data channel change timing is notified. In a part or all of data channel beacon signals transmitted before the change timing of the data channel, the channel change existence information, the new data channel No. and data channel change timing are set. Therefore, in the case where there is a node which periodically starts up and sleeps during a period of time other than that, the started up node is highly likely to follow up the data channel without shifting to the control channel. Below, details thereof are described.

Among nodes, the node may exist which sleeps during a period of time than the transmission and reception timings of the node-self. For example, it is considered that the node exists which starts up every several data channel beacon signals and then receives the data channel beacon signal. In this case, if, as in first embodiment, the data channel is changed at a transmission timing of a data channel beacon signal transmitted next to the data channel beacon signal including the channel change existence information and the new data channel No., the node which receives the data channel beacon signal one time every the several beacon signal cannot follow the change of the data channel. Therefore, the node loses a data channel beacon signal transmitted via the new data channel after the change.

In the case, in the first embodiment, the node changes the operation channel to the control channel once and finds the new data channel to shift to the new data channel. However, this requires two times of channel changes before shifting to the new data channel, resulting in that power consumption in the node increases.

In the second embodiment, in order to solve this problem, the data channel change timing is added to data channel beacon signal as well as the channel change existence information and the new data channel No. Below, the present embodiment is described in detail.

Figure 8:
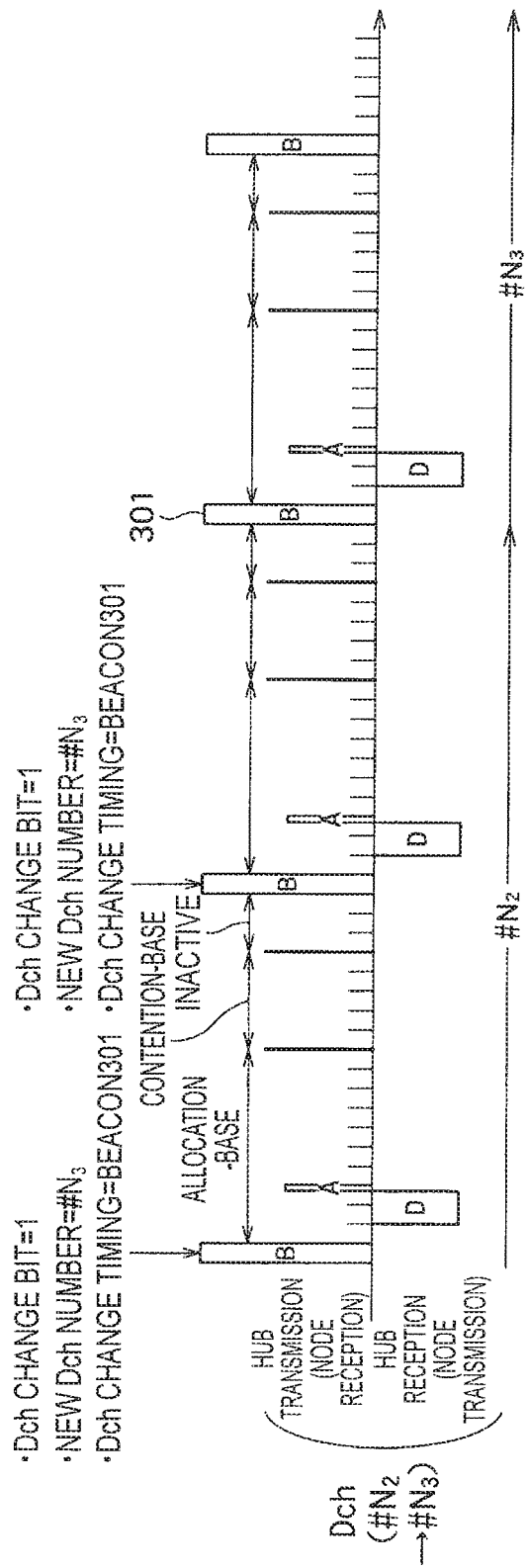
FIG. 8 is a drawing for explaining an access scheme used at a time of a channel change in a system according to a second embodiment.

With reference to FIG. 8, an access scheme used at the time of the channel change in the system according to the present embodiment is explained.

The difference from FIG. 2 is that the hub inserts the data channel change timing in the data channel beacon signal in addition to the channel change and the new data channel No. In the example shown in FIG. 2, information for identifying a transmission timing of the beacon signal 301 is inserted as the data channel change timing. When the access controller 33 of the hub determines to change the data channel, it determines a change timing of the data channel and inserts information on the determined timing in the data channel beacon signal together with the channel change and the new data channel No.

The node which has received the data channel beacon signal recognizes the new data channel No. and the timing for changing the data channel to the new data channel. According the timing, the node changes the data channel to the channel of the new data channel No. by controlling the PHY&RF unit 120. In the example shown in FIG. 8, on or after transmission of the beacon signal 301, the node employs the channel #$N_3$ in the data channel by controlling the transmitter 121 and the receiver 122 in the PHY&RF unit 120.

An example of determining the data channel change timing is described blow. For example, it is assumed that from nodes connected to the hub, the hub previously receives information on a period (interval) of starting up and a sleep time length. The information indicates, for example, that the node starts up every what number of beacon intervals to receive the data channel and entries into the sleep again on or after a next beacon transmission timing. The hub determines the data channel change timing according to a longest period of starting up among the nodes connected to the hub. The period of starting up corresponds to a reception period (reception interval) of the data channel beacon.

As one example, the hub determines the data channel change timing to a transmission timing of the beacon signal the longest period length after transmission of the data channel beacon signal which notifies the channel change. However, among the nodes connected to the hub, a long sleep node which starts up in an excessively long period may exist. The long sleep node may be defined as a node which does not successively receive the beacon signals X times. A value of X (upper bound) is not limited to a specific value: however, X is 2 or more in order to distinguish the long sleep node from the normal sleep node. If the long sleep node exists among the nodes, the hub may determines the data channel change timing according to one of periods of starting up in the nodes other than the long sleep node.

The format of information on the data channel change timing inserted in the data channel beacon signal may be any format. For example, the change timing may be specified by a sequence number (SN) of the data channel beacon at the change timing of the channel. Alternatively, if the changing timing is a transmission timing of the beacon signal after the data channel beacon signal is transmitted x times, the change timing may be specified by "x".

Figure 9:
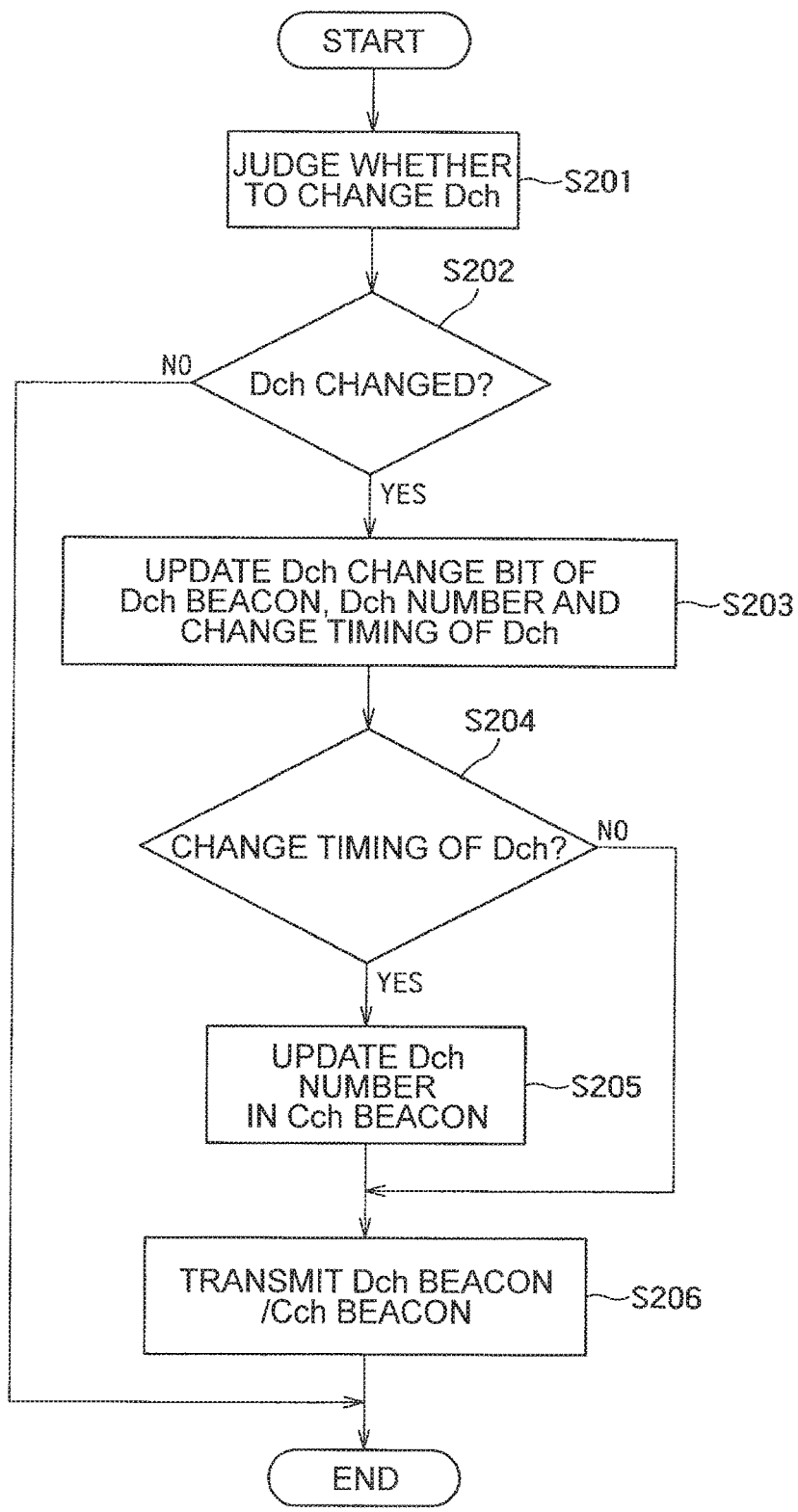
FIG. 9 is a flow chart of channel management processing in a hub according to the second embodiment.

FIG. 9 is a flow chart of channel management processing performed by the hub according to the present embodiment.

The access controller 33 of the hub starts the processing at any trigger such as periodically or when any condition is satisfied. The access controller 33 first determines whether to perform the channel change of the data channel (S201). When the access controller 33 determines not to change the data channel (NO in S202), it ends the processing.

When the access controller 33 determines to change the data channel (YES in S202), it instructs the transmission processor 31 to generate a beacon signal frame which includes the channel change existence information being the bit set in the data channel change field, the new data channel No. and information on the data channel change timing (S203). The transmission processor 31 generates the beacon signal frame of the data channel according to the instruction from the access controller 33.

The access controller 33 determines whether it becomes the change timing of the data channel (S204). When it becomes the data channel change timing, the access controller 33 instructs the transmission processor 31 to change the data channel No. included in the control channel beacon signal to the new data channel No. (S205). The transmission processor 31 generates the beacon signal frame, of the control channel, including the new data channel No. according to the instruction from the access controller 33. When it does not become the data channel change timing, the access controller 33 does not instruct the update of the number of the data channel to the transmission processor 31.

The access controller 33 instructs the transmission processor 31 to transmit the beacon signal frame at a beacon transmission timing of the data channel, the beacon signal frame including the channel change existence information, the new data channel No. and the data channel change timing (S206). The transmission processor 31 transmits the beacon signal frame at a beacon transmission timing of the control channel via the transmitter 20 by the control channel, the beacon signal frame including the new data channel No. (S206). The access controller 33 changes the setting of the operation channel in the transmitter 20 and the receiver 22 via the channel controller 34 so that the new data channel is used for transmission/reception of the data channel beacon signal and other signals on or after the change timing of the data channel.

According to the second embodiment, the data channel change timing is determined in a case where the data channel is determined to be changed, and information such as the data channel change timing is included in each data channel beacon signal transmitted before the data channel change timing. Therefore, the node which periodically starts up and receives the data channel beacon signal can recognize the data channel change and the timing thereof without shifting to the control channel at a high likelihood, and follow up the data channel after the change.

Third Embodiment

In the first and the second embodiments, although the transmission period of the control channel beacon signal is constant, in the third embodiment, a case is shown in which the transmission period of the control channel beacon signal is changed when the data channel is changed.

Figure 10:
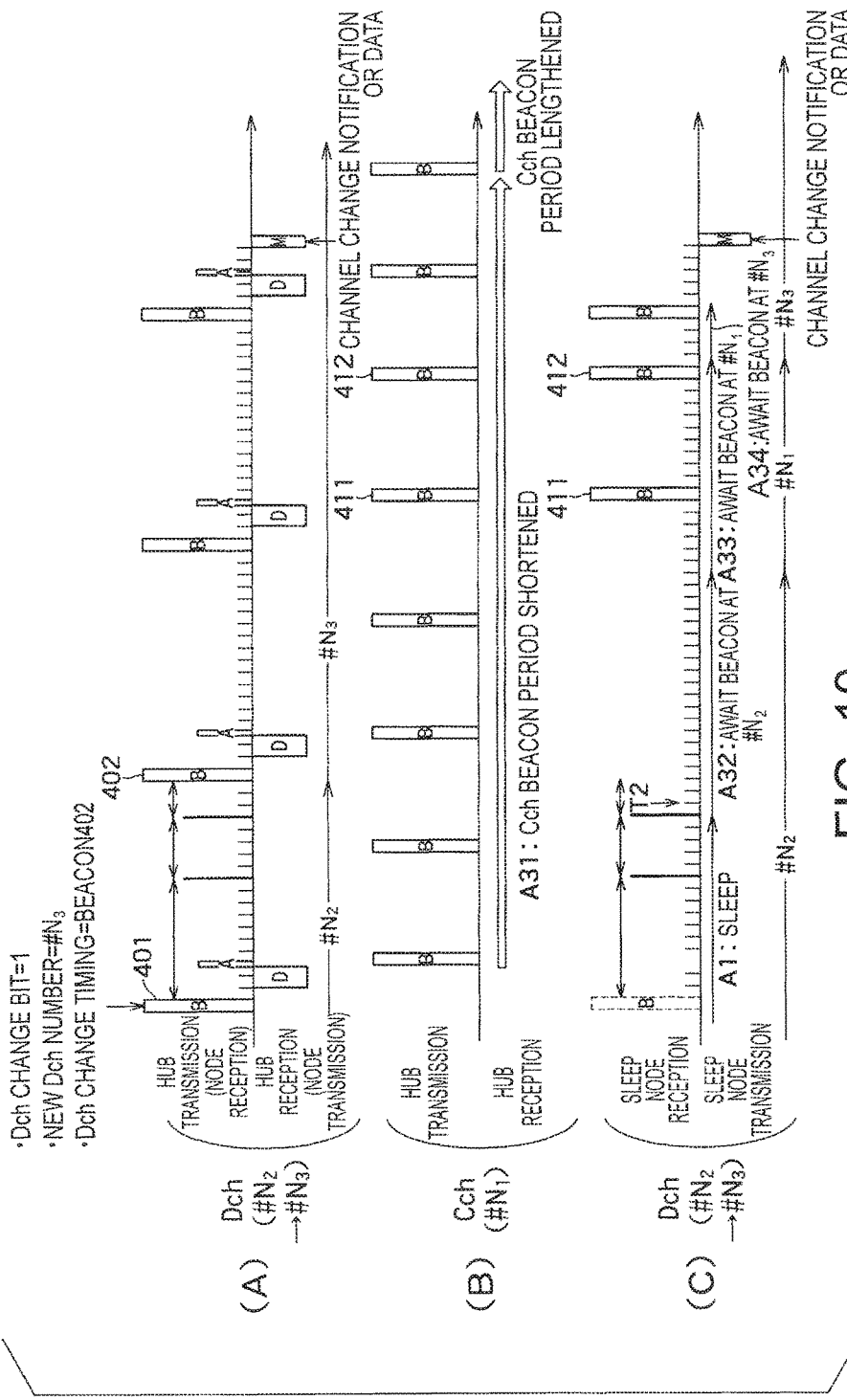
FIG. 10 is a drawing for explaining an access scheme used at a time of a channel change in a system according to a third embodiment.

With reference to FIG. 10, an access scheme used at the time of the channel change in the system according to the third embodiment is explained.

The hub according to the present embodiment sets, for the purpose of reduced power consumption, a transmission period of the control channel beacon signal to a longer value than that of a base period. For example, the transmission period is set to a value twice as long as the base period. The base period is predetermined such that the signal collision does not occur among adjacent hubs. Specifically, a case may be in which the control channel beacon signal has functions of sharing states of hubs and the hubs transmit respective control channel beacon signals at the same control channel in a time sharing manner. Under such a circumstance, the base period of the control channel beacon signal is predetermined such that the signal collision is prevented among the adjacent hubs.

When the hub determines the data channel change, the hub, at a trigger of the data channel change, shortens the transmission period of the control channel beacon signal or sets it back to the base period. In a case where the hub sets the transmission period shorter than the base period, the hubs previously confirm any periods available by the hubs in order to prevent the signal collision among the adjacent hubs. In a case where there are a plurality of hubs, each hub receives the control channel beacon signals transmitted by other hubs than the node-self, and thereby can recognize information such as the data channel used by the adjacent other hubs. Therefore, the hub may determine to change the data channel to the channel unused by the adjacent other hubs.

As shown in FIG. 10(A), the hub notifies the data channel change timing etc. by the data channel beacon signal 401 via the data channel#$N_2$. In this example, the data channel change timing is a transmission timing of the data channel beacon signal 402 which is transmitted next to the data channel beacon signal 401. The data channel after the change is the channel#$N_3$. In this case, as shown in FIG. 10(B), the hub shortens the transmission period of the control channel beacon signal on or after the transmission timing of the data channel beacon signal 401 (A31). Alternatively, the hub may shorten the transmission period of the control channel beacon signal on or after a transmission timing of the beacon signal transmitted next to the data channel beacon signal 401.

Although in this example, the channel is changed from the transmission timing of the beacon signal transmitted next to the data channel beacon signal 401, the channel change may be made from the transmission timing of the beacon signal transmitted after transmission of several data channel beacon signals from the data channel beacon signal 401. In this case, on or after the channel change timing or a beacon signal transmission timing before the channel change timing by one beacon interval or more, such control may be made that the transmission period of the control channel beacon signal is shortened.

On the other hand, as shown in FIG. 10(C), the sleep node starts up at a time T2. After the sleep node starts up at the time T2, the sleep node awaits reception of the data channel beacon signal at the channel #$N_2$ during one data channel beacon interval (A32).

However, the sleep node cannot receive the data channel beacon signal at the channel#$N_2$. For this reason, the sleep node shifts to the control channel#$N_1$ and awaits reception of the beacon signal (A33).

In the example shown in the drawing, the sleep node receives a plurality of control channel beacons 411 and 412 during awaiting the beacon signal. Although in the example shown in FIG. 3(C) in the first embodiment, the sleep node awaits reception of the beacon signal during the same time period as that in shown in FIG. 10(C), the number of times of reception of the beacon signal is only one. In contrast, in the example in FIG. 10(C), the number of times of reception of the beacon signals is two since the transmission period of the beacon signal is shortened.

Therefore, if the node successfully receives the control channel beacon signal 411 which is first transmitted (there is no frame error) and confirm the new data channel No., the node may omit awaiting processing of the subsequent control channel beacon signal and reception processing thereof. Thereby, the node can rapidly shift to the new data channel.

Even if there is the frame error on the first received control channel beacon signal 411, the node can early receive the second control channel beacon signal and thus it becomes possible to early shift to the new data channel at a high likelihood.

When the sleep node confirms the new data channel No., the sleep node changes the operation channel from the control channel to the data channel (A34).

After the hub shortens the transmission period of the control channel beacon signal, if the predetermined condition is satisfied, the hub again lengthens the transmission period of the control channel beacon signal. As the predetermined condition, it may include that the hub can confirm that a constant number or a constant ratio of the nodes connected to the hub have shifted to the new channel. The example thereof is that all of the nodes connected to the hub have shifted to the new channel.

Alternatively, as the predetermined condition, it may include that a constant period of time lapses after a predetermined trigger occurs. The example thereof is that a constant period of time lapses after a timing at which the transmission period is shortened. Alternatively, instead of the timing at which the transmission period is shortened, it may be a timing at which the hub has confirm that a predetermined number of nodes (the value of which is smaller than the total number of the nodes) or a predetermined ratio (the value of which is smaller than one) of nodes shifted to the new channel.

As the method in which the hub confirms that the nodes connected to the hub shifted to the new channel, the following method is proposed.

As one example, the node which shifted to the new channel transmits, by the data channel after the change, any data or a control signal such as a channel change notification (channel change announcement) at the slot allocated to the node-self. The any data may be data required to transmit to the hub (for example, ordinary data such as sensor data) or null data having no frame body.

In the example of FIG. 10(A), the node transmits the channel change notification or data at the slot allocated to the node-self within the allocation-based access period in the third data channel beacon interval after shifting to the new channel#$N_3$. The signal shown by the rectangle with character "M" means this.

In the example of FIG. 10(C), the sleep node transmits the channel change notification or data at the slot allocated to the node-self within the allocation-based access period in the first data channel beacon interval after shifting to the new channel#$N_3$. The signal shown by the rectangle with character "M" means this.

According to the third embodiment, at the time of data channel change, the transmission period of the control channel beacon signal is shortened. This enables the node to rapidly shift to the new channel at a high likelihood. Other than the case of the data channel change, the transmission period of the control channel beacon signal is lengthened and the power consumption of the hub can be reduced.

Fourth Embodiment

Figure 11:
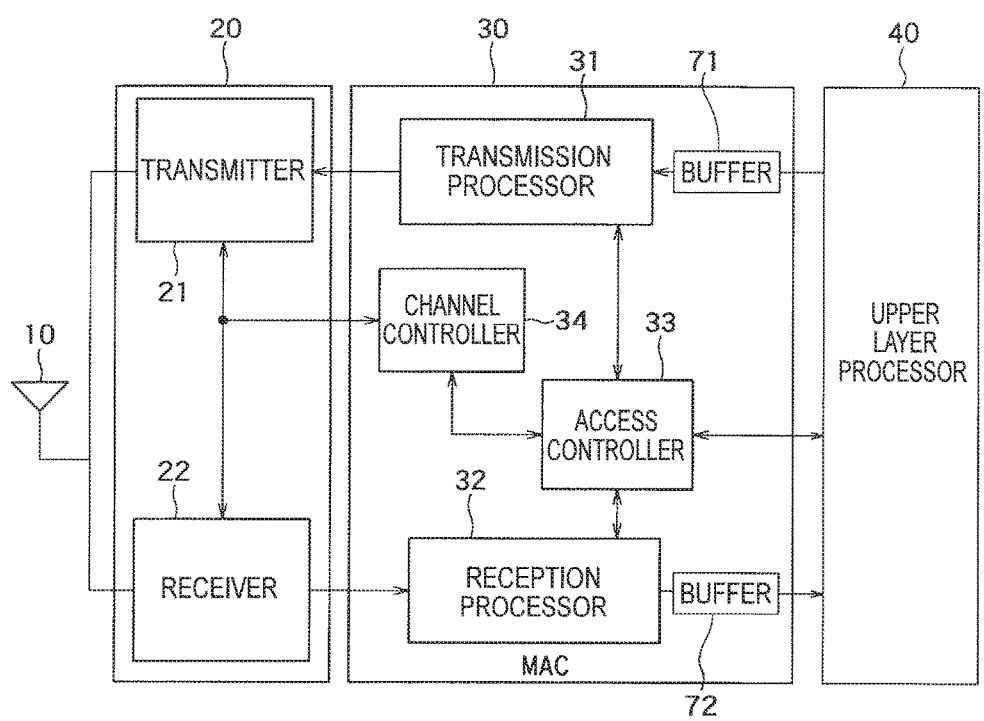
FIG. 11 is a block diagram of a wireless communication device which is a hub according to a fourth embodiment.

FIG. 11 shows a block diagram of a hub including a wireless communication device according to a fourth embodiment.

In the hub shown in FIG. 11, buffers 71 and 72 are added to the MAC unit 30 of the wireless communication device according to the first embodiment shown in FIG. 4. The buffers 71 and 72 are connected to the transmission processor 31 and the reception processor 32. The upper layer processor 40 performs input and output with the transmission processor 31 and the reception processor 32 through the buffers 71 and 72. The buffers 71 and 72 can be, for example, arbitrary volatile memories or non-volatile memories. In this way, the buffers 71 and 72 can be provided to hold the transmission frame and the reception frame in the buffers 71 and 72. The retransmission process, QoS control according to the frame type etc. or the output process to the upper layer processor 40 can be easily performed.

The configuration of adding the buffers can be similarly applied to the node.

Figure 12:
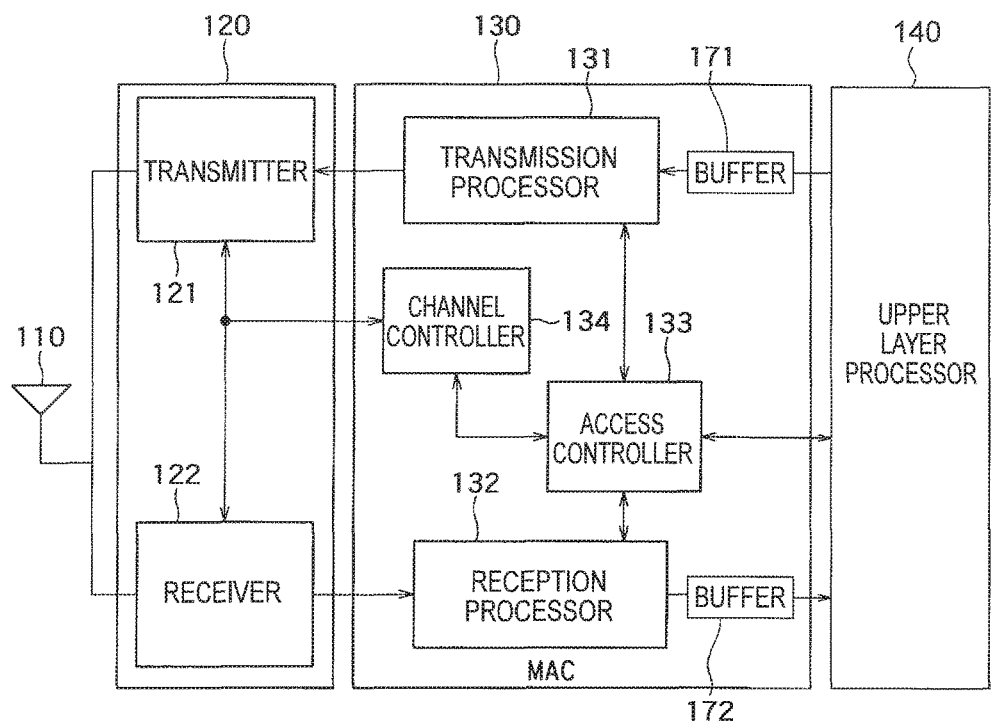
FIG. 12 is a block diagram of a wireless communication device which is a node according to a fourth embodiment.

FIG. 12 shows a block diagram of a node including a wireless communication device according to a fourth embodiment.

In the node shown in FIG. 12, buffers 171 and 172 are added to the MAC unit 130 of the wireless communication device according to the first embodiment shown in FIG. 5. The buffers 171 and 172 are connected to the transmission processor 131 and the reception processor 132, respectively. The upper layer processor 140 performs input and output with the transmission processor 131 and the reception processor 132 through the buffers 171 and 172. The buffers 171 and 172 can be, for example, arbitrary volatile memories or non-volatile memories. In this way, the buffers 171 and 172 can be provided to hold the transmission data and the reception data in the buffers 171 and 172. The retransmission process, QoS control according to the frame type etc., or the output process to the upper layer processor 140 can be easily performed.

Fifth Embodiment

Figure 13:
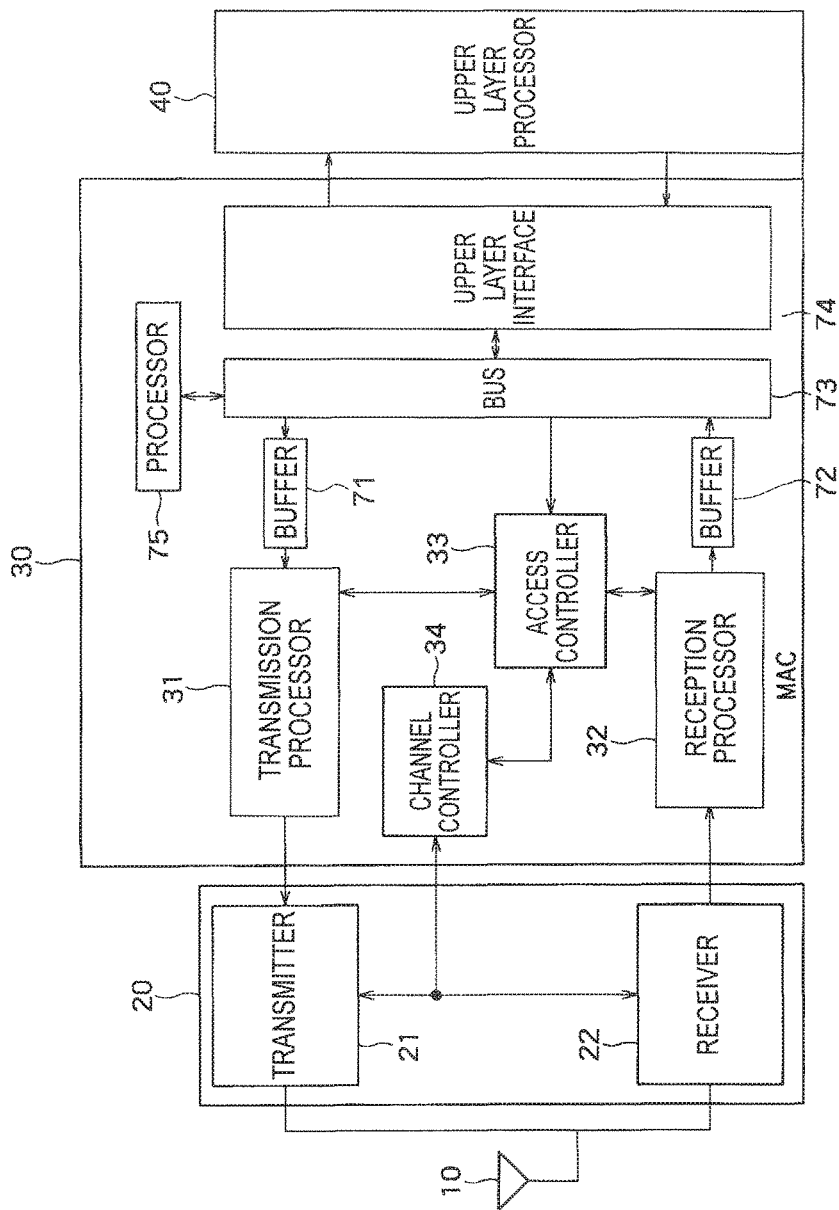
FIG. 13 is a block diagram of a wireless communication device which is a hub according to a fifth embodiment.

FIG. 13 shows a block diagram of a hub including a wireless communication device according to a fifth embodiment.

The hub illustrated in FIG. 13 has a form that a bus 73 is connected to the buffers 71 and 72 and the access controller 33 in the fourth embodiment illustrated in FIG. 11, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of at least one of the access controller 33 and the channel controller 34 may be achieved by the processor 75.

Figure 14:
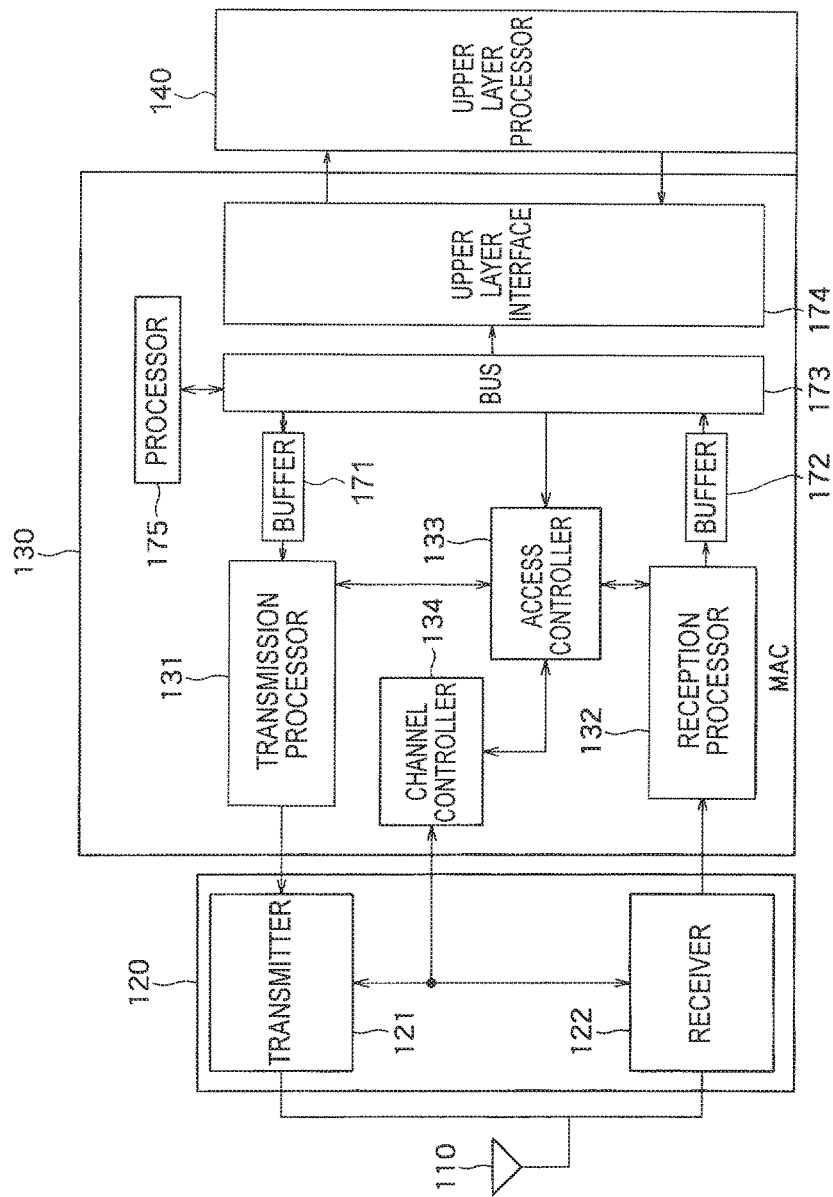
FIG. 14 is a block diagram of a wireless communication device which is a node according to a fifth embodiment.

FIG. 14 shows a block diagram of a node including a wireless communication device according to a fifth embodiment.

The node illustrated in FIG. 14 has a form that a bus 173 is connected to the buffers 171 and 172 and the access controller 133 in the fourth embodiment illustrated in FIG. 12, and an upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of at least one of the access controller 133 and the channel controller 134 may be achieved by the processor 175.

Sixth Embodiment

Figure 15:
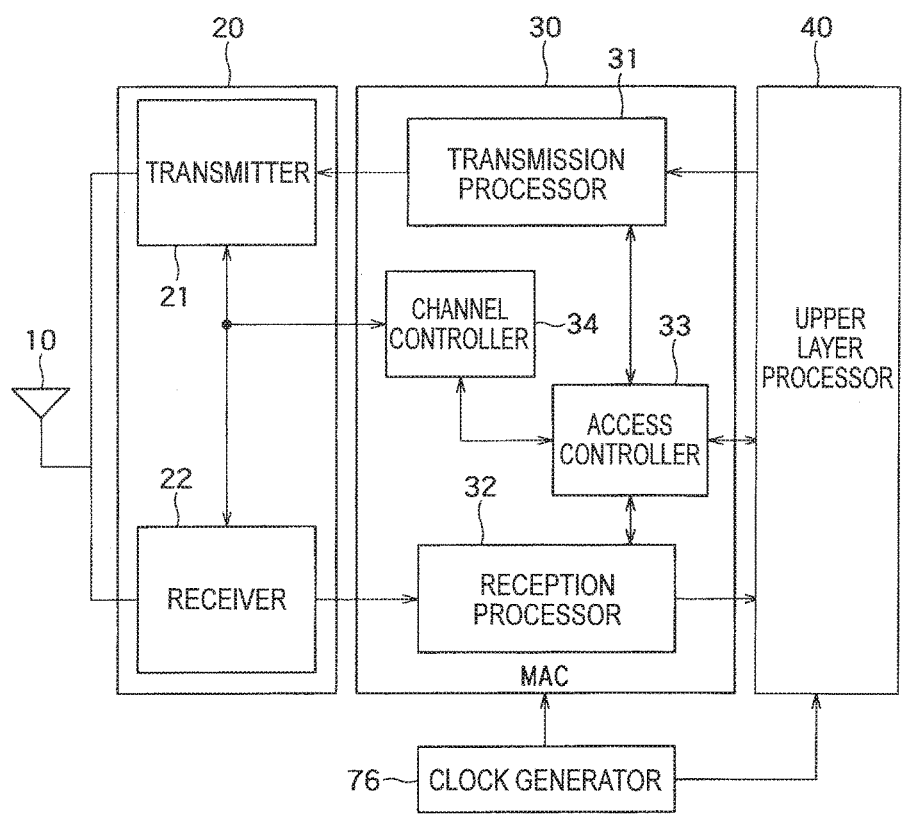
FIG. 15 is a block diagram of a wireless communication device which is a hub according to a sixth embodiment.

FIG. 15 shows a block diagram of a hub including a wireless communication device according to a sixth embodiment.

The wireless communication device illustrated in FIG. 15 has a form that a clock generator 76 is connected to the MAC unit 30 in the hub relating to the first embodiment illustrated in FIG. 4. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit 30, however, it may be provided inside the MAC unit 30.

Figure 16:
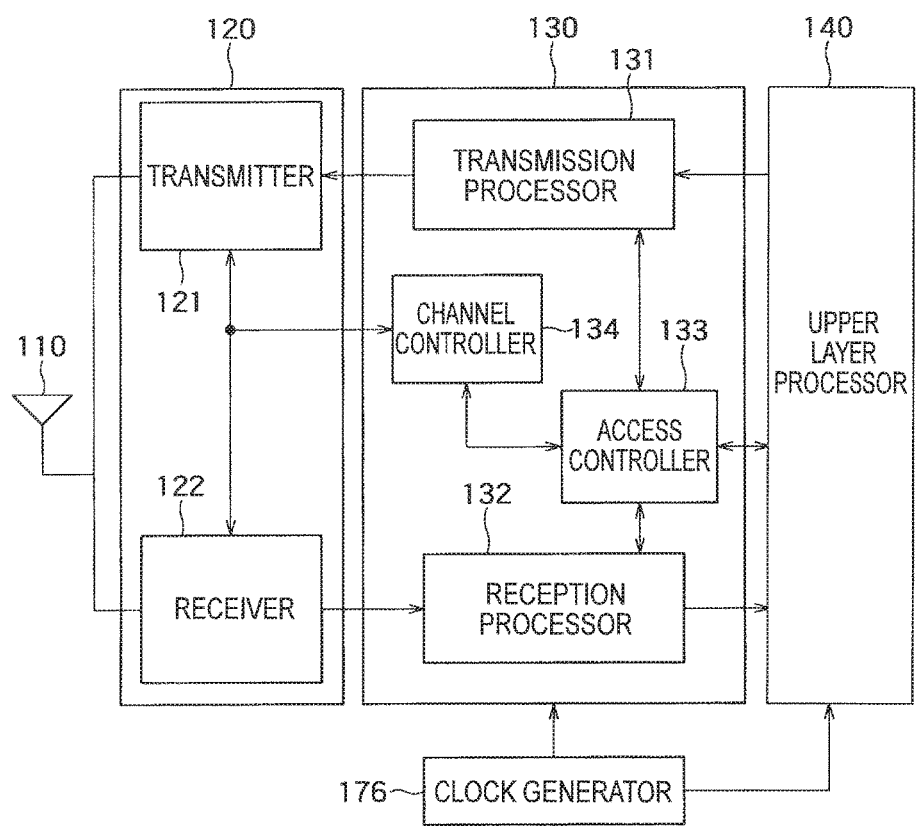
FIG. 16 is a block diagram of a wireless communication device which is a node according to a sixth embodiment.

FIG. 16 shows a block diagram of a node including a wireless communication device according to a sixth embodiment.

The wireless communication device illustrated in FIG. 16 has a form that a clock generator 176 is connected to the MAC unit 130 in the node relating to the first embodiment illustrated in FIG. 5. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit 130, however, it may be provided inside the MAC unit 130.

Seventh Embodiment

Figure 17:
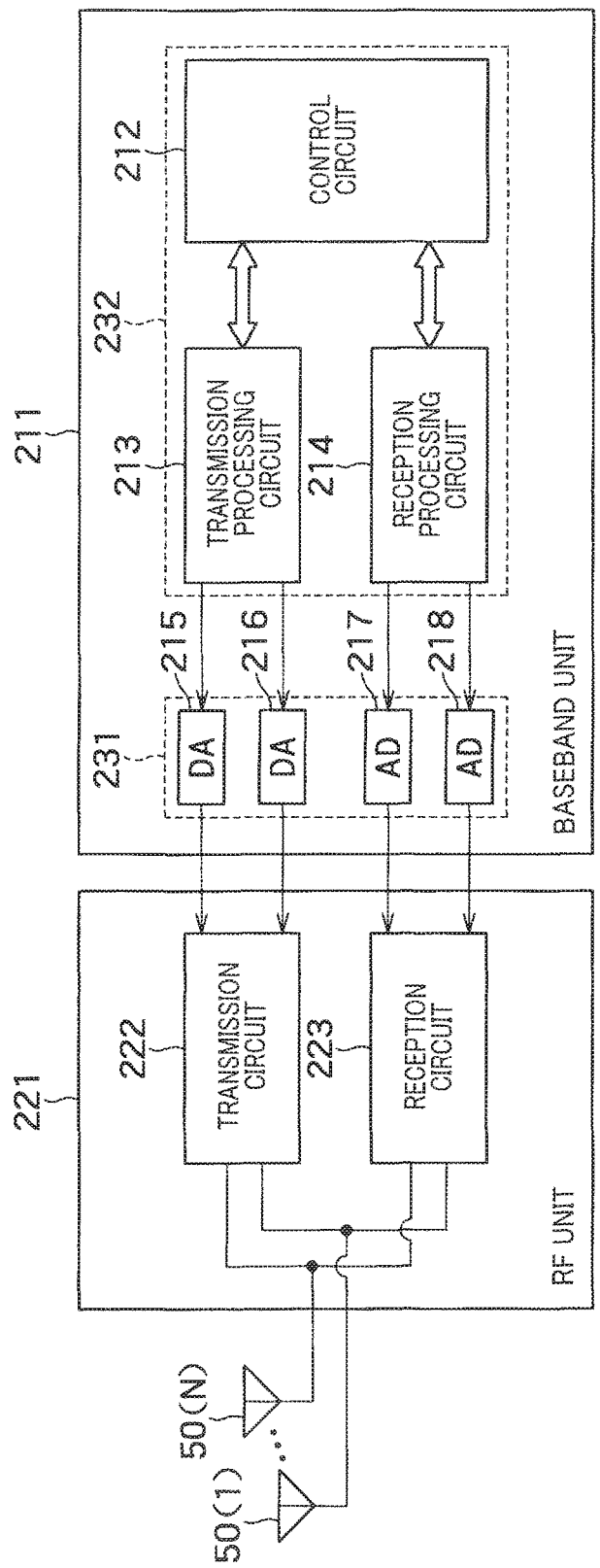
FIG. 17 is a hardware block diagram of a wireless communication device according to a seventh embodiment.

FIG. 17 illustrates an example of a hardware configuration of a wireless communication device in accordance with a seventh embodiment. This hardware configuration is only provided by way of example, and various modifications can be made to this hardware configuration. The operation of the wireless communication device illustrated in FIG. 17, detailed description of which is omitted, is performed in the same or similar manner as in the wireless communication devices described in the context of the previous embodiments, and the following explanation focuses on the differences in respect of the hardware configuration. It should be noted that the illustrated hardware configuration can be applied both to the wireless communication device that operates as a hub and to the wireless communication device that operates as a node.

This wireless communication device includes a baseband unit 211, an RF unit 221, and antennas 50(1) to 50(N) (where N is an integer equal or larger than one).

The baseband unit 211 includes a control circuit 212, a transmission processing circuit 213, a reception processing circuit 214, DA conversion circuits 215, 216, and AD conversion circuits 217, 218. The RF unit 221 and the baseband unit 211 may be collectively configured as one-chip IC (integrated circuit) or may be configured as independent chips.

As one example, the baseband unit 211 is a baseband LSI or a baseband IC. Alternatively, the baseband unit 211 may include an IC 232 and an IC 231 in the illustrated manner as indicated by dotted lines. In this context, components may be incorporated in a distributed manner on these ICs such that the IC 232 includes the control circuit 212, the transmission processing circuit 213, and the reception processing circuit 214 while the IC 231 includes the DA conversion circuits 215, 216 and the AD conversion circuits 217, 218.

The control circuit 212 is mainly configured to execute the functionality of the MAC processor 30 and 130 of FIGS. 4 and 5, etc. The functionality of the upper layer processor 40 and 140 may be included in the control circuit 112.

The transmission processing circuit 213 corresponds to the section that performs the processing before DA conversion processing in the transmitter 21 and 121 in FIGS. 4 and 5, etc. Specifically, the transmission processing circuit 213 mainly performs processing associated with the physical layer including addition of a preamble and a PHY header, encoding, modulation (which may include MIMO modulation), and generates, for example, two types of digital baseband signals (hereinafter referred to as the digital I-signal and Q-signal). It should be noted that another configuration can be contemplated according to which the functionality performed before DA conversion processing in the transmitter 21 and 121 of FIGS. 4 and 5, etc. may be included in the transmission processing circuit 213, the functionality performed after AD conversion processing in the receiver 22 and 122 may be included in the reception processing circuit 214.

The communication processing device of this embodiment corresponds, for example, to the control circuit 212, the transmission processing circuit 213, and the reception processing circuit 214. The communication processing device of this embodiment may take either configuration of a one-chip IC configuration or a multiple-chip IC configuration.

The DA conversion circuits 215 and 216 correspond to the section associated with the digital-to-analog conversion in the transmitter 21 and 121 of FIGS. 4 and 5, etc. The DA conversion circuits 215 and 216 are configured to perform digital-to-analog conversion for the signals input from the transmission processing circuit 213. More specifically, the DA conversion circuit 215 converts a digital I-signal into an analog I-signal, and the DA conversion circuit 216 converts a digital Q-signal into an analog Q-signal. It should be noted that there may be a case where the signals are transmitted as single-channel signals without the quadrature modulation being performed. In this case, it suffices that one single DA conversion circuit is provided. In addition, when transmission signals of one single channel or multiple channels are transmitted in a distributed manner in accordance with the number of antennas, DA conversion circuits may be provided in the number corresponding to the number of the antennas.

The RF unit 221, by way of example, is an RF analog IC or a high-frequency wave IC. The transmitting circuit 222 in the RF unit 221 corresponds to the section associated with the processing following the digital-to-analog conversion out of the functions of the transmitter 21 and 121 illustrated in FIGS. 4 and 5, etc. The transmitting circuit 222 includes a transmission filter that extracts a signal of a desired bandwidth from the signal of the frame that has been subjected to the digital-to-analog conversion by the DA conversion circuits 215 and 216, a mixer that performs up-conversion for the signal that has been subjected to the filtering to the wireless frequency using a signal having a predetermined frequency supplied from an oscillation device, a pre-amplifier (PA) that performs amplification for the signal that has been subjected to the up-conversion, and the like.

The receiving circuit 223 in the RF unit 221 corresponds to the section associated with the processing prior to the analog-to-digital conversion from among the functions of the receiver 22 and 122 illustrated in FIGS. 4 and 5, etc. The receiving circuit 223 includes an LNA (low noise amplifier) that amplifies the signal received by the antenna, a mixer that performs down-conversion of the amplified signal to the baseband using a signal having a predetermined frequency supplied from an oscillation device, a reception filter that extracts a signal of a desired bandwidth from the signal that has been subjected to the down-conversion, and the like. More specifically, the receiving circuit 223 performs quadrature demodulation for the reception signal, which has been subjected to the low noise amplification by a low noise amplifier, by carrier waves with 90 degree phase shift with respect to each other and thus generates an I-signal (In-phase signal) having the same phase as that of the reception signal and a Q-signal (Quad-phase signal) whose phase is delayed by 90 degrees with respect to the reception signal. The I-signal and the Q-signal are output from receiving circuit 223 after being subjected to the gain adjustment.

The control circuit 212 may control the operation of the transmission filter of the transmitting circuit 222 and the reception filter of the receiving circuit 223. Another controller that controls the transmitting circuit 222 and the receiving circuit 223 may be provided and the same or similar control may be realized by the control circuit 212 sending instructions to that controller.

The AD conversion circuits 217, 218 in the baseband unit 211 correspond to the section of the receiver 22 and 122 that performs the analog-to-digital conversion out of the processing of the receiver 22 and 122 as illustrated in FIGS. 4 and 5, etc. The AD conversion circuits 217, 218 perform analog-to-digital conversion for the input signal that is input from the receiving circuit 223. More specifically, the AD conversion circuit 217 converts the I-signal into a digital I-signal and the AD conversion circuit 218 converts the Q-signal into a digital Q-signal. It should be noted that quadrature demodulation may not be performed and only a single-channel signal may be received. In this case, only one AD conversion circuit has to be provided. When a plurality of antennas are provided, AD conversion circuits in the number corresponding to the number of the antennas may be provided. The reception processing circuit 214 corresponds to the section that performs the processing following the AD conversion out of the processing of the receivers 22 and 122 as illustrated in FIGS. 4 and 5, etc. Specifically, the reception processing circuit 214 performs demodulation processing for the signal that has been subjected to the analog-to-digital conversion, processing of removing the preamble and the PHY header, and the like processing, and delivers the frame that has been processed to the control circuit 212.

It should be noted that a switch may be arranged in the RF unit for switching the antennas 50(1) to 50(N) between the transmitting circuit 222 and the receiving circuit 223. By controlling the switch, the antennas 50(1) to 50(N) may be connected to the transmitting circuit 222 at the time of transmission and the antennas 50(1) to 50(N) may be connected to the receiving circuit 223 at the time of reception.

Although the DA conversion circuits 215, 216 and the AD conversion circuits 217, 218 are arranged on the side of the baseband unit 211 in FIG. 17, another configuration may be adopted where they are arranged on the side of the RF unit 221.

It should be noted that the wireless communicator may be formed by the transmitting circuit 222 and the receiving circuit 223. The wireless communicator may be formed by further adding DA conversion circuits 215, 216 and the DA conversion circuits 217, 218 to the transmitting circuit 222 and the receiving circuit 223. The wireless communicator may be formed by including, in addition to these components, the PHY processing portions (i.e., the modulator and the demodulator) of the transmission processing circuit 213 and the reception processing circuit 214. Alternatively, the wireless communicator may be formed by the PHY reception processing portions of the transmission processing circuit 213 and the reception processing circuit 214.

Eighth Embodiment

Figure 18:
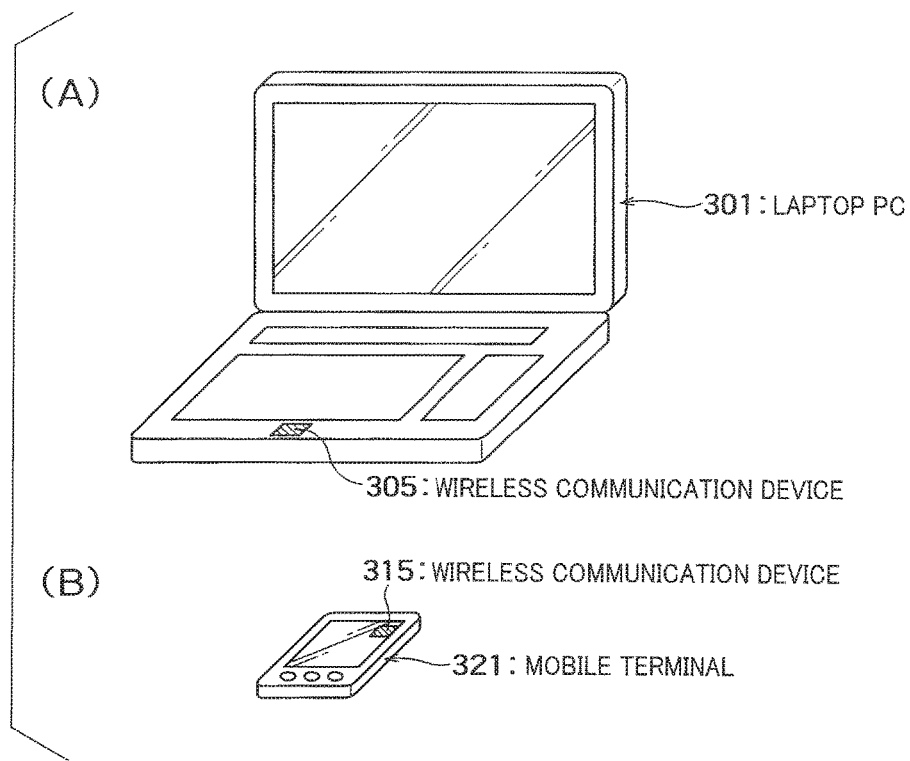
FIG. 18 is a perspective view of a wireless communication terminal according to an eighth embodiment.

FIG. 18(A) and FIG. 18(B) are perspective views of a wireless communication terminal (wireless device) in accordance with an eighth embodiment. The wireless device of FIG. 18(A) is a laptop PC 301 and the wireless device of FIG. 19(B) is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, the wireless communication device may be incorporated in a television, digital camera, wearable device, tablet, smartphone, etc.

Figure 19:
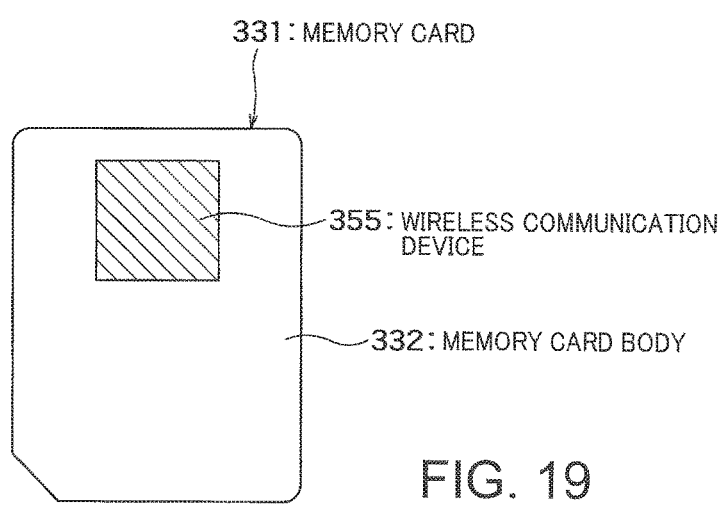
FIG. 19 is a view showing a memory card according to an eighth embodiment.

In addition, the wireless communication device can be incorporated in a memory card. FIG. 19 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 19.

Ninth Embodiment

A ninth embodiment includes a bus, a processor, and an external interface in addition to the configuration of the wireless communication device in accordance with any one of the first to eighth embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware.

Tenth Embodiment

A tenth embodiment includes a clock generator in addition to the configuration of the wireless communication device in accordance with any one of the first to eighth embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

Eleventh Embodiment

A eleventh embodiment includes a power source, a power source controller, and a wireless power supply in addition to the configuration of the wireless communication device in accordance with any one of the first to eighth embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

Twelfth Embodiment

A twelfth embodiment includes a SIM card in addition to the configuration of the wireless communication device in accordance with the eleventh embodiment. The SIM card is connected, for example, to the MAC processor in the wireless communication device or to the controller, etc. In this manner, by providing a configuration where the SIM card is provided in the wireless communication device, it is made possible to readily perform the authentication processing.

Thirteenth Embodiment

A thirteenth embodiment includes a video compression/extension unit in addition to the configuration of the wireless communication device in accordance with the ninth embodiment. The video compression/extension unit is connected to a bus. In this manner, by configuring the video compression/extension unit included in the wireless communication device, it is made possible to readily perform transfer of the compressed video and the extension of the received compressed video.

Fourteenth Embodiment

A fourteenth embodiment includes an LED unit in addition to the configuration of the wireless communication device in accordance with any one of the first to eighth embodiments. The LED unit is connected, for example, to the MAC processor in the wireless communication device, the transmission processing circuit 213, the reception processing circuit 214, or the control circuit 212, etc. In this manner, by providing a configuration where the LED unit is provided in the wireless communication device, it is made possible to readily notify the operating state of the wireless communication device to the user.

Fifteenth Embodiment

A fifteenth embodiment includes a vibrator unit in addition to the configuration of the wireless communication device in accordance with any one of the first to eighth embodiments. The vibrator unit is connected, for example, to the MAC processor in the wireless communication device, the transmission processing circuit 213, the reception processing circuit 214, or the control circuit 212, etc. In this manner, by providing a configuration in which the vibrator unit is provided in the wireless communication device, it is made possible to readily notify the operating state of the wireless communication device to the user.

Sixteenth Embodiment

Figure 20:
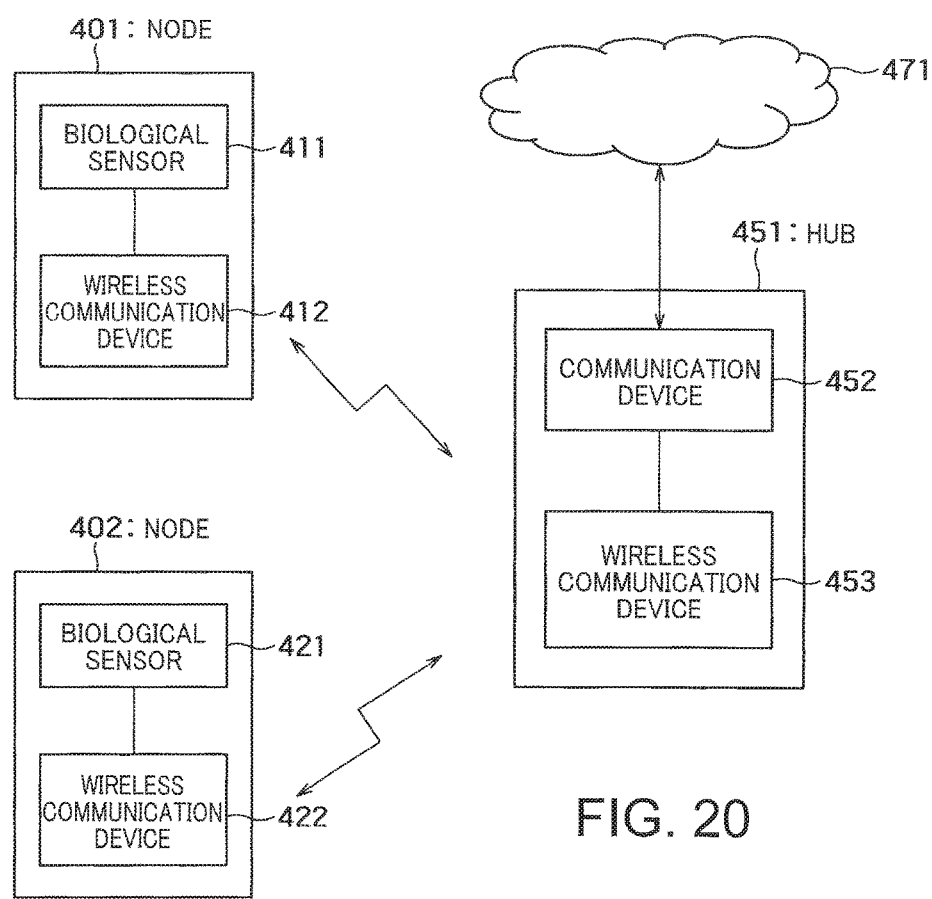
FIG. 20 is a view showing a wireless communication system according to a sixteenth embodiment.

FIG. 20 illustrates an overall configuration of a wireless communication system in accordance with a sixteenth embodiment. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological sensor 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may be provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

Figure 21:
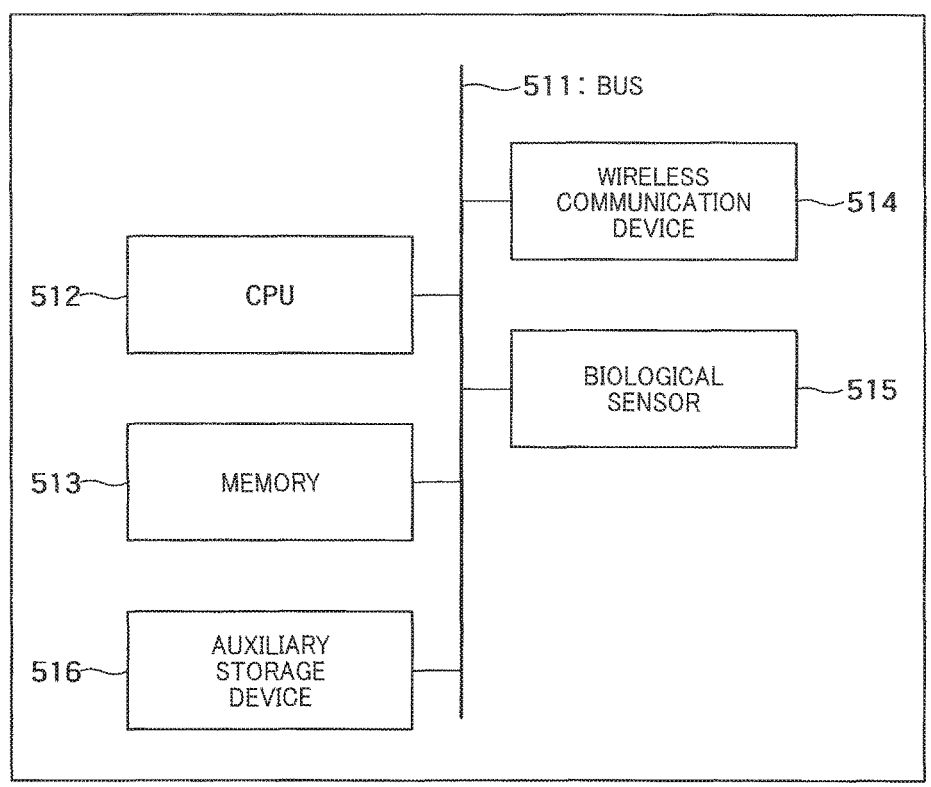
FIG. 21 is a hardware block diagram of a node according to a sixteenth embodiment.

FIG. 21 is a block diagram illustrating a hardware configuration of the node 401 or node 402 illustrated in FIG. 20. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 20, and the biological sensor 515 corresponds to the biological sensor 411, 421 of FIG. 20. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

Figure 22:
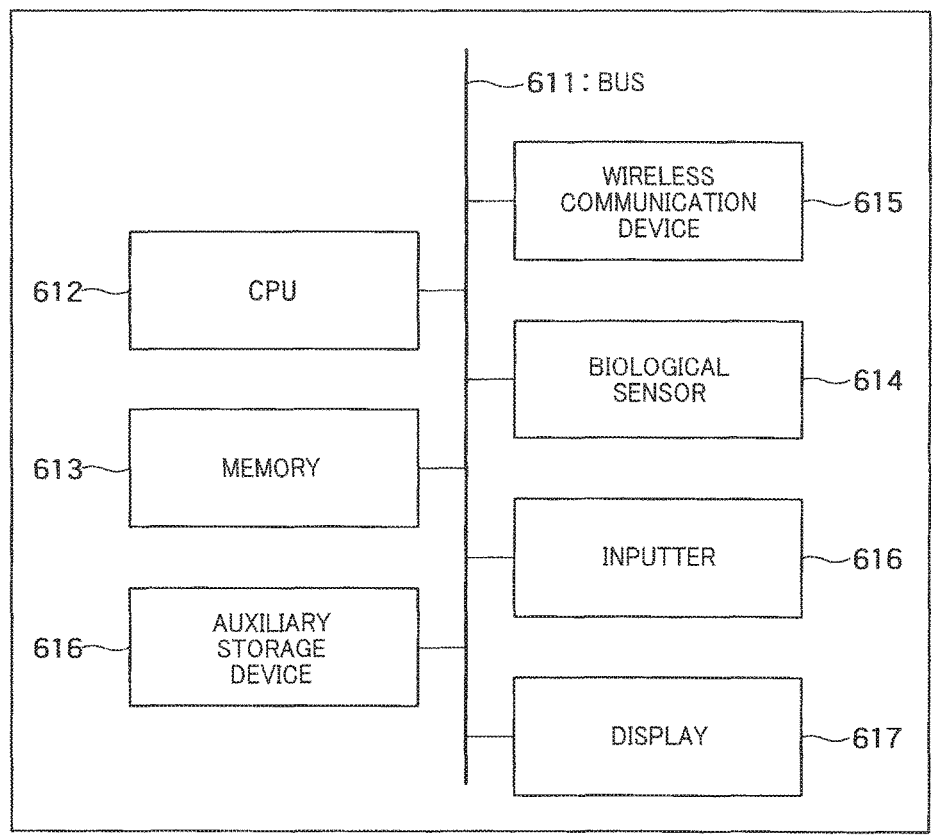
FIG. 22 is a hardware block diagram of a hub according to a sixteenth embodiment.

FIG. 22 is a block diagram that illustrates a hardware configuration of the hub 451 illustrated in FIG. 20. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 20, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus corresponding to a hub communicable with at least one terminal corresponding to a node via a first channel of a control channel and a second channel of a data channel, the electronic apparatus comprising:
   transmission circuitry configured to
      transmit a first beacon frame including "1" in a first field indicating a switch of the data channel and including a number of a third new channel in a second field indicating a channel number via the second channel informing the at least one terminal that the data channel will switch from the second channel to the third channel, and
      transmit a second beacon frame including the number of the third channel in a third field indicating a data channel number via the first channel after the data channel is switched from the second channel to the third channel; and
   reception circuitry configured to receive a data frame via the third channel after the data channel is switched from the second channel to the third channel.

2. The electronic apparatus according to claim 1, wherein
   a beacon interval of the data channel includes a first period used for communication according to an allocated slot, a second period used for communication according to a contention based access scheme after the first period, and a third period not used for communication after the second period, and
   the reception circuitry is configured to receive the data frame via the third channel within the first period after the data channel is switched from the second channel to the third channel.

3. The electronic apparatus according to claim 1, wherein the first beacon frame includes information specifying a beacon frame transmitted at a timing at which the data channel is switched from the second channel to the third channel in a fourth field indicative a timing of channel change.

4. The electronic apparatus according to claim 1, wherein
   the electronic apparatus is attached to a biological body, and forms a body area network with the at least one terminal, and
   the reception circuitry receives the data frame including sensing information acquired by a biosensor from the biological body.

5. The electronic apparatus according to claim 1, further comprising:
   a processor configured to execute firmware; and
   at least one antenna, wherein
   the transmission circuitry includes the processor and transmits the first beacon frame and the second beacon frame via the at least one antenna.

6. The electronic apparatus according to claim 1, further comprising:
   a host processor configured to perform at least a process of an upper layer than a medium access control (MAC) layer; and
   a clock generator, wherein
   at least the reception circuitry and the transmission circuitry are included in a wireless communication apparatus, a clock signal generated by the clock generator is supplied to both the host processor and the wireless communication apparatus, and the wireless communication apparatus and the host processor operate according to the clock signal.

7. The electronic apparatus according to claim 1, further comprising
at least one of an light emitting diode (LED) and a vibrator, wherein
the electronic apparatus notifies a user of an operation state of the transmission circuitry or the reception circuitry by at least one of the LED and the vibrator.

8. A wireless communication method performed by an electronic apparatus communicable with at least one terminal via a first channel of a control channel and a second channel of a data channel, the wireless communication method comprising:
transmitting a first beacon frame including "1" in a first field indicating a switch of the data channel and including a number of a third new channel in a second field indicating a channel number via the second channel informing the at least one terminal that the data channel will switch from the second channel to the third channel;
transmitting a second beacon frame including the number of the third channel in a third field indicating a data channel number via the first channel after the data channel is switched from the second channel to the third channel; and
receiving a data frame via the third channel after the data channel is switched from the second channel to the third channel.

9. The wireless communication method according to claim 8, wherein
a beacon interval of the data channel includes a first period used for communication according to an allocated slot, a second period used for communication according to a contention based access scheme after the first period, and a third period not used for communication after the second period, and
the wireless communication method further comprises receiving the data frame via the third channel within the first period after the data channel is switched from the second channel to the third channel.

10. The wireless communication method according to claim 8, wherein the first beacon frame includes information specifying a beacon frame transmitted at a timing at which the data channel is switched from the second channel to the third channel in a fourth field indicative a timing of channel change.

11. The wireless communication method according to claim 8, wherein
the electronic apparatus is attached to a biological body, and forms a body area network with one or more terminal, and
the wireless communication method further comprises receiving the data frame including sensing information acquired by a biosensor from the biological body.

12. The wireless communication method according to claim 8, further comprising:
executing firmware in a processor; and
transmitting the first beacon frame and the second beacon frame via at least one antenna.

13. The wireless communication method according to claim 8, further comprising:

performing at least a process of an upper layer than a medium access control (MAC) layer in a host processor;
performing transmission of at least the first beacon frame and the second beacon frame in a wireless communication apparatus;
supplying a clock signal generated by a clock generator to both the host processor and the wireless communication apparatus; and
operating the wireless communication apparatus and the host processor according to the clock signal.

14. The wireless communication method according to claim 8, further comprising:
performing transmission of at least the first beacon frame and the second beacon frame in a transmitter; and
notifying a user of an operation state of the transmitter by at least one of an light emitting diode (LED) and a vibrator.

15. An electronic apparatus corresponding to a node communicable with a base station corresponding to a hub via a first channel of a control channel and a second channel of a data channel, the electronic apparatus comprising:
reception circuitry configured to
receive a first beacon frame including "1" in a first field indicating a switch of the data channel and including a number of a third new channel in a second field indicating a channel number via the second channel informing the electronic apparatus that the data channel will switch from the second channel to the third channel, and
receive a second beacon frame including the number of the third channel in a third field of a data channel number via the first channel after the data channel is switched from the second channel to the third channel; and
transmission circuitry configured to transmit a data frame via the third channel after the data channel is switched from the second channel to the third channel.

16. The electronic apparatus according to claim 15, wherein
a beacon interval of the data channel includes a first period used for communication according to an allocated slot, a second period used for communication according to a contention based access scheme after the first period, and a third period not used for communication after the second period, and
the transmission circuitry is configured to transmit the data frame via the third channel within the first period after the data channel is switched from the second channel to the third channel.

17. The electronic apparatus according to claim 15, wherein the first beacon frame includes information specifying a beacon frame transmitted at a timing at which the data channel is switched from the second channel to the third channel in a fourth field indicative a timing of channel change.

18. The electronic apparatus according to claim 15, wherein
the electronic apparatus is attached to a biological body, and forms a body area network with the base station, and
the transmission circuitry transmits the data frame including sensing information acquired by a biosensor from the biological body.

19. The electronic apparatus according to claim 15, further comprising:
a processor configured to execute firmware; and at least one antenna, wherein
the reception circuitry includes the processor and receives the first beacon frame and the second beacon frame via the at least one antenna.

20. The electronic apparatus according to claim 15, further comprising:
a host processor configured to perform at least a process of an upper layer than a medium access control (MAC) layer; and
a clock generator, wherein
at least the reception circuitry and the transmission circuitry are included in a wireless communication apparatus,
a clock signal generated by the clock generator is supplied to both the host processor and the wireless communication apparatus, and
the wireless communication apparatus and the host processor operate according to the clock signal.

21. The electronic apparatus according to claim 15, further comprising:
at least one of an light emitting diode (LED) and a vibrator, wherein
the electronic apparatus notifies a user of an operation state of the transmission circuitry or the reception circuitry by at least one of the LED and the vibrator.

22. A wireless communication method performed by an electronic apparatus communicable with a base station via a first channel of a control channel and a second channel of a data channel, the wireless communication method comprising:
receiving a first beacon frame including "1" in a first field indicating a switch of the data channel and including a number of a third new channel in a second field indicating a channel number via the second channel informing the electronic apparatus that the data channel will switch from the second channel to the third channel;
receiving a second beacon frame including the number of the third channel in a third field of a data channel number via the first channel after the data channel is switched from the second channel to the third channel; and
transmitting a data frame via the third channel after the data channel is switched from the second channel to the third channel.

23. The wireless communication method according to claim 22, wherein
a beacon interval of the data channel includes a first period used for communication according to an allocated slot, a second period used for communication according to a contention based access scheme after the first period, and a third period not used for communication after the second period, and
the wireless communication method further comprises transmitting the data frame via the third channel within the first period after the data channel is switched from the second channel to the third channel.

24. The wireless communication method according to claim 22, wherein the first beacon frame includes information specifying a beacon frame transmitted at a timing at which the data channel is switched from the second channel to the third channel in a fourth field indicative a timing of channel change.

25. The wireless communication method according to claim 22, wherein
the electronic apparatus is attached to a biological body, and forms a body area network with the base station, and
the wireless communication method further comprises transmitting the data frame including sensing information acquired by a biosensor from the biological body.

26. The wireless communication method according to claim 22, further comprising
executing firmware in a processor; and
receiving the first beacon frame and the second beacon frame via at least one antenna.

27. The wireless communication method according to claim 22, further comprising:
performing at least a process of an upper layer than a medium access control (MAC) layer in a host processor;
performing reception of the first beacon frame and the second beacon frame in a wireless communication apparatus;
supplying a clock signal generated by a clock generator to both the host processor and the wireless communication apparatus; and
operating the wireless communication apparatus and the host processor operate according to the clock signal.

28. The wireless communication method according to claim 22, further comprising:
performing reception of at least the first beacon frame and the second beacon frame in a receiver; and
notifying a user of an operation state of the receiver by at least one of an light emitting diode (LED) and a vibrator.

* * * * *